(12) United States Patent
Potter et al.

(10) Patent No.: US 7,536,283 B2
(45) Date of Patent: May 19, 2009

(54) STORAGE OPTIMIZATION SYSTEM AND METHOD

(75) Inventors: Michael D. Potter, Dover, DE (US); David D. Bethel, Newport News, VA (US)

(73) Assignee: L&P Property Management Company, South Gate, CA (US)

( * ) Notice: Subject to any disclaimer, the term of this patent is extended or adjusted under 35 U.S.C. 154(b) by 1602 days.

(21) Appl. No.: 10/336,290

(22) Filed: Jan. 3, 2003

(65) Prior Publication Data

US 2004/0133483 A1 Jul. 8, 2004

(51) Int. Cl.
*G06F 17/50* (2006.01)
*G06Q 10/00* (2006.01)

(52) U.S. Cl. .................. 703/1; 703/2; 707/10; 345/349; 715/211; 715/848

(58) Field of Classification Search .................. 702/2; 705/7; 345/349; 715/211, 243, 848; 703/1, 703/2; 707/10

See application file for complete search history.

(56) References Cited

U.S. PATENT DOCUMENTS

| | | |
|---|---|---|
| 3,705,410 A | 12/1972 | Kooey et al. |
| 5,383,111 A | 1/1995 | Homma et al. |
| 5,602,730 A | 2/1997 | Coleman et al. |
| 5,812,985 A | 9/1998 | Failing et al. |
| 5,930,766 A | 7/1999 | Gibb |
| 5,950,190 A * | 9/1999 | Yeager et al. .................. 707/3 |
| 6,016,481 A | 1/2000 | Failing, Jr. et al. |
| 6,101,506 A | 8/2000 | Ukai et al. |
| 6,147,686 A | 11/2000 | Brown et al. |
| 2001/0047293 A1* | 11/2001 | Waller et al. .................. 705/10 |
| 2005/0240605 A1* | 10/2005 | Knoblock et al. .......... 707/100 |

OTHER PUBLICATIONS

The Shelf Logic® Family of Planogram Software (10 pages) http://www.shelflogic.com/products.htm, Dec. 5, 2001.

* cited by examiner

*Primary Examiner*—Thai Phan
(74) *Attorney, Agent, or Firm*—Michael Best & Friedrich LLP

(57) ABSTRACT

A system and method are provided by which items in an inventory can be arranged in a storage space based upon one or more factors such as item dimensions, weight, type, sorting codes, stackability, and the like. In some cases, the system and method generate multiple inventory arrangements from which a desired inventory arrangement can be selected, such as a highly efficient inventory arrangement.

86 Claims, 18 Drawing Sheets

FIG. 2

ISS STORAGE CAPACITY MODEL

ISS ENGINEERING SERVICE & TECHNOLOGY
11236 HARLAND DRIVE, NE
COVINGTON, GA 30014
Ph# 800-871-6073 contact: Michael D. Porter
ph# 888-710-1861

CUSTOMER INFORMATION:
COMPANY NAME HERE
123 USA STREET
SOMEWHERE, US 99999-9999
CONTACT NAME HERE
PHONE/FAX NUMBER HERE
EMAIL ADDRESS HERE
STORE TYPE • SALES VOLUME • DELIVERIES

RESTAURANT AREAS:
AREAS: examples
A: Dry Storage
B: Cooler
C: Freezer
D: Front Counter
E: Drive Thru
F: Workstations
G: Janitorial/Chemical

CODES:
DS
CL
FZ
FC
DT
WS
JC

Areas can be added or changed, establish a master list with codes, and then start sorting the data by area. Inventory can then be sorted by showing unit segments.

| PRODUCT / INVENTORY DESCRIPTION | ITEM NUMBER | ON-HAND CASE QUANTITY | CASE LENGTH (inches) | CASE DEPTH (inches) | CASE HEIGHT (inches) | CASE WEIGHT (lbs.) | VERTICAL STORAGE Yes or No | STACK QUANTITY (1-5) | Sorting Columns (codes) |
|---|---|---|---|---|---|---|---|---|---|
| EXAMPLE PRODUCT | 123ABC | 12 | 24 | 24 | 12 | 12 | YES | 2 | EXAM |
| SAMPLE PRODUCT | ZZZ999 | 48 | 18 | 24 | 8 | 50 | NO | 2 | SAMP |
| HAMBURGER | 9001 | 6 | 20 | 20 | 12 | 30 | NO | 2 | HAMB |
| CLEANER | AA-9009 | 2 | 12 | 18 | 10 | 20 | NO | 2 | CLEA |
| CUPS | 9004 | 2 | 24 | 24 | 36 | 5 | NO | 1 | DS |
| CLEANER RAGS | AA-9010 | 2 | 15 | 20 | 8 | 5 | NO | 2 | JC |
| CUP LIDS | 9005 | 2 | 24 | 24 | 36 | 5 | NO | 1 | DS |
| FRENCH FRIES | 9002 | 6 | 15 | 20 | 15 | 20 | NO | 2 | FREN |
| ONION RINGS | 9003 | 4 | 15 | 20 | 15 | 15 | NO | 2 | FZ |

Copyright (C) 2001, International Storage Systems
Loading ISS v3.9 ..........................
ISS Loaded
Copyright (C) 2001, International Storage Systems
Loading ISS-SH v3.6 ................toolbar Enter toolbar name or [ALL]:
SWFILECONV.TB_XW
Enter an option [Show/Hide/Left/Right/Top/Bottom/Float] <Show>: show
AutoCAD menu utilities loaded.
AutoCAD Express Tools Menu loaded.
Command: ISS-SH *(command to start ISS-SH stand alone program)*
_.UNDO Enter the number of operations to undo or
[Auto/Control/BEgin/End/Mark/Back] <1>: _END
Command: _.UNDO Enter the number of operations to undo or
[Auto/Control/BEgin/End/Mark/Back] <1>: _GROUP
Command: Regenerating model.
Microsoft Windows Version 4.10 (x86) Release Visual LISP 2000 (en) -
International Storage Systems Shelving ....
Shelf Width <24/30/36/42/48/54/60/66/72>: 48 *(all standard shelf width options)*
Shelf Depth <14/18/21/24/30/36>: 24 *(all standard shelf depth options)*
Post Height <8/14/34/54/62/74/86/96/108/120>: 86 *(all standard post height options)*
Number Of Shelves: 5 *(specify how many shelves are needed)*
Legs - 4/2Wide/2Deep/None <4>: 4 *(option for 4 legs, or 2 if using add-on units)*
Insert Point: _.INSERT Enter block name or [?] <POST86>: UNIT1 Specify
insertion point or [Scale/X/Y/Z/Rotate/PScale/PX/PY/PZ/PRotate]:
Enter X scale factor, specify opposite corner, or [Corner/XYZ] <1>: 1 Enter Y
scale factor <use X scale factor>: 1 Specify rotation angle <0>:
Insert Angle <0>:
Command: _.LAYER
Current layer: "0"
Enter an option
[?/Make/Set/New/ON/OFF/Color/Ltype/LWeight/Plot/Freeze/Thaw/LOck/U
nlock]: _SET
Enter layer name to make current <0>: 0 Enter an option
[?/Make/Set/New/ON/OFF/Color/Ltype/LWeight/Plot/Freeze/Thaw/LOck/U
nlock]:
Command: _.UNDO Enter the number of operations to undo or
[Auto/Control/BEgin/End/Mark/Back] <1>: _END
Command: Regenerating model.

```
Is There A Known Space Allocation (Y/N) <N>: y
Segment 1 Overall Shelf Allocation:  48 (48 entered as segment length)
Segment 1 Length: 48
Segment 2 Overall Shelf Allocation:
Segment 1 - Overall Length: 48 (4'-0")
  Attempt:  (1)48
  Maximum Shelf Width <48>:
  Sizes:    (1)48
```
944 { `UNIT 1 TOO TALL (error prompt indicating unit too tall)`
      `OVERFLOW ON UNIT1`
```
Segment 1 - Overall Length: 54 (4'-6")  (prompts you to attempt next highest shelf length)
  Attempt:  (1)54
  Maximum Shelf Width <54>:
  Sizes:    (1)54
UNIT1 - 54 x 18 - 86 Posts - 3 Shelves @(8 35 68)  (shelving unit description)
Shelf Length: 54 Inches - Module Usage: 135 Inches
Total Shelf Usage: 150 Inches - Shelf Efficiency: 90.00%  (shelf efficiency rating)
Best Case:  (1)54Regenerating model.
_.UNDO Enter the number of operations to undo or
[Auto/Control/BEgin/End/Mark/Back] <1>:_END
```

← 940

FIG. 9B (908 points to "48 (48 entered as segment length)" line)
(948 points to "54 (4'-6")" line)

STORAGE OPTIMIZATION SYSTEM AND METHOD

BACKGROUND OF THE INVENTION

An adequately managed inventory system is important for any business involved in the sale of goods or services. To adequately manage inventory items, businesses keep track of inventory item count. If desired, the inventory management systems maintain a sufficient amount of inventory items available, forecast the usage of inventory items, and timely re-order an appropriate amount of inventory items.

However, it is just as important to be able to place the inventory items in a manner that allows users to have easy access to the inventory items as well as to know where to access the inventory items. For example, placement of inventory items becomes important if the associated storage spaced is limited, or when existing shelves have fixed sizes. Furthermore, some inventory items may be seasonal or may otherwise require periodic movement or arrangement, and can therefore require special placement preferences while maintaining adequate accessibility to other items. Furthermore, the business may have to adhere to certain special codes such as those provided by different government agencies.

In the food service industry, for example, a primary concern of food service providers is the allocation of resources to providing items on the menu ordered by customers. With existing inventory management techniques, food service providers are able to check and track inventory items, order new inventory items from a list of suppliers when desired, log who has access to the inventory items, and log when the inventory items are accessed. Some existing methods even allow businesses to forecast inventory needs. However, the same food service providers also need to know how inventory items should be placed or stocked in order to achieve an efficient and usable inventory arrangement. For example, a food service provider may like to access its most frequently used items in a readily accessible location, may require that heavy items be located in low positions on storage shelving, and may prefer particular inventory stacking and arrangements.

These and many other inventory storage considerations must often be balanced to identify an efficient and logical inventory storage arrangement. However, due at least in part to the large number of considerations, the large array of different product types and sizes, and an overwhelming number of different possible inventory arrangements, many storage locations in various businesses remain inefficiently organized.

Many methods and techniques have been developed for some of the tasks mentioned above, such as tracking inventory items, forecasting and indicating inventory needs, and re-ordering inventory items. These types of methods, programs and techniques perform their functions generally adequately. However, these methods, programs and techniques do not elaborate or provide how and where to store and place the inventory in an efficient and logical manner.

SUMMARY OF THE INVENTION

Accordingly, the present invention provides a computer-based automated or semi-automated inventory storage system and method. Although this system and method is well-suited for the restaurant and food service industries, it should be noted that the present invention can be employed in any business and industry in which items of an inventory are stored.

Some embodiments of the present invention provide for a software program for arranging a plurality of items in an inventory in a storage space, wherein the software program comprises an inventory module for generating a master inventory list and a storage shelving module for generating an inventory layout based on the master inventory list, the inventory layout being an arrangement of items of the inventory on at least one shelf. The master inventory list can include dimensions for each one of the plurality of items and a quantity of each one of the plurality of items.

Also, some embodiments of the present invention provide a method of arranging a plurality of items of an inventory in a storage space, whereby the method includes inputting via a user interface data representative of at least one dimension and a quantity of each of the plurality of items via a user interface; generating a master inventory including dimensions for each one of the plurality of items and a quantity for each one of the plurality of items; generating via a processor an inventory layout of the plurality of items based at least in part upon the master inventory list; and displaying the inventory layout upon a display screen.

In another aspect of the present invention, a method of preparing an arrangement of items in an inventory on at least one shelf is provided, whereby the method includes receiving dimensions of items in the inventory input into a user interface by a user; comparing at least one dimension of an item in the inventory with at least one dimension of a first shelf in a memory; allocating a space upon the first shelf to the item in the inventory if the at least one dimension of the item is no greater than the at least one dimension of the first shelf stored in the memory; comparing the at least one dimension of the item in the inventory with at least one dimension of a second shelf stored in the memory if the at least one dimension of the item is greater than the at least one dimension of the shelf stored in the memory; and repeating both comparing steps and the allocating step with at least one other item in the inventory.

Some embodiments of the present invention provide for an automated method of storing items of an inventory on shelving, wherein the method comprises obtaining inventory data at a processor (the inventory data including at least one inventory characteristic); obtaining shelving data at the processor (the shelving data having at least one shelf characteristic); generating via the processor a plurality of virtual inventory items using the inventory data; generating via the processor a plurality of virtual shelves using the shelving data; repeatedly shelving the virtual inventory on the virtual shelves in an arrangement based at least in part upon at least one of the inventory characteristics; and determining a shelf usage based at least in part upon the shelved virtual cases.

In still other embodiments of the present invention, an automated storage method for generating shelving arrangements of items in an inventory is provided, wherein the method comprises obtaining data at a processor including a plurality of inventory characteristics; repeatedly virtually shelving inventory starting with at least one of the inventory characteristics; and determining a shelf usage based on the inventory characteristics.

Further objects and advantages of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

In the drawings:

FIG. 2 is an exemplary spreadsheet according to the present invention showing inventory data on a master inventory list tab;

FIG. 3 is an exemplary spreadsheet showing the inventory data of FIG. 2 and a pop-up sorting window on a freezer tab;

FIG. 4 is the exemplary spreadsheet of FIG. 3, showing the inventory data following a sorting procedure;

FIG. 5 is an exemplary listing of model generating commands according to an embodiment of the present invention;

FIG. 9B is an exemplary display of the interactive commands where an insufficient space allocation is available;

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

DETAILED DESCRIPTION

Figure 1:
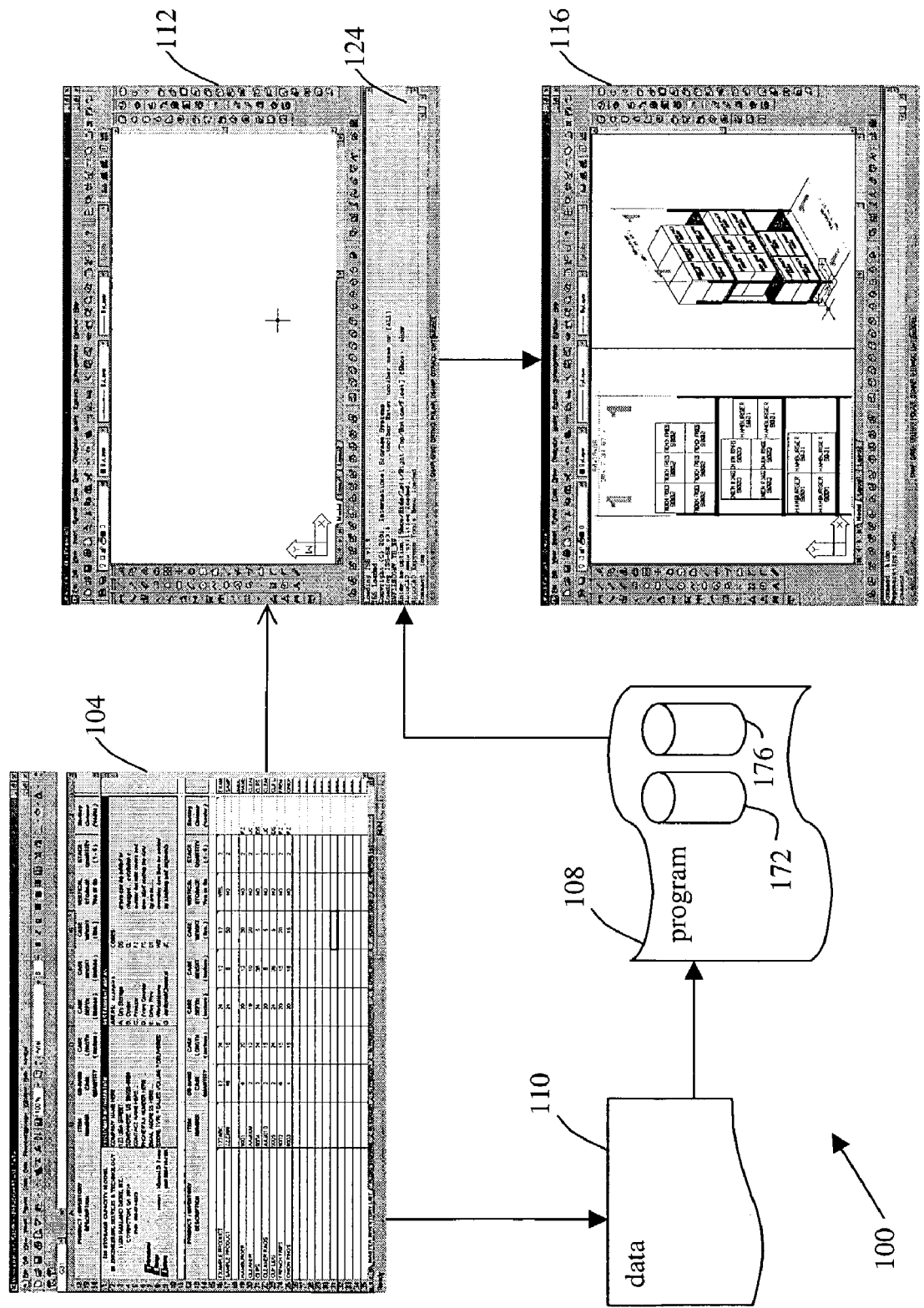
FIG. 1 is a schematic drawing of the storage arrangement system according to an exemplary embodiment of the present invention.

FIG. 1 shows a storage capacity model 100 according to an exemplary embodiment of the present invention. The model 100 uses a spreadsheet application 104 such as Microsoft Excel, Novell Quattro Pro, IBM Lotus 1-2-3 or the like, together with one or more software programs 108 using programming languages such as LISP in a computer aided design ("CAD") application 112 (e.g., Autodesk AutoCAD). The storage capacity model 100 can reside and/or be run in any computer or computer network in which data can be processed (such as through a microprocessor or other controller, not shown), and can store and retrieve data as described below in any computer-accessible memory (such as a hard drive, floppy discs, compact discs, or other computer-readable media, also not shown). In addition, the software programs 108 described herein can be replaced by one or more hardware components and assemblies adapted to perform the same functions as the software programs 108 described herein.

The spreadsheet application 104 generally provides a medium through which inventory data is entered. In this regard, inventory data can be input by a user in a number of different manners, such as by computer-readable media, by a mouse and/or keyboard (not shown), and the like. The spreadsheet application 104 can also provide tools to analyze the inventory data, generate a select set of data 110, and/or communicate the data 110 to the programs 108. In some embodiments, the programs 108 determine an arrangement of inventory in terms of storage shelving layouts based at least in part upon the inventory data, and export data corresponding to this arrangement to the CAD application 112 for a planogram display 116.

The starting point of the storage capacity model 100 illustrated in the figures is the spreadsheet application 104. Although a spreadsheet is shown here, other applications that allow data entry can also be employed in the present invention. FIG. 2 shows an exemplary spreadsheet 120 of the spreadsheet application 104. The spreadsheet 120 can be divided into a plurality of information areas 126 where customer or inventory information is displayed, entered, or both displayed and entered. The spreadsheet 104 also includes a plurality of tabs 128 at the bottom. Tabs 128 are used in the illustrated embodiment, but need not exist in others. In other embodiments, the data and other information found on the tabs 128 in the illustrated embodiment are instead located in different areas of the spreadsheet, in different files, or in still other locations. If employed, the information areas 126 contain customer information, special notes, project information, product or business category information, inventory sorting codes, and the like.

The spreadsheet 120 in the illustrated embodiment also consists of a plurality of columns containing information relating to inventory items. For example, the spreadsheet 120 includes an inventory description column 132 which stores a description of the inventory. The spreadsheet 120 also includes an inventory number column 136 that stores an assigned number (e.g., product identification number) of the inventory. Preferably, neither of the items stored in the description column 132 and numbers stored in the number column 136 are duplicated. An on-hand case quantity column 140 is also included in the exemplary spreadsheet 120. The on-hand case quantity column 140 stores a quantity of inventory that is available at any given point in time. The on-hand case quantity column 140 in the exemplary spreadsheet 120 is followed by three dimensional columns including a case length column 144, a case depth column 148, and a case height column 152. In addition to these dimensional columns, 144, 148, 152, which store the dimensions of the inventory, the spreadsheet 120 can also have a case weight column 156 that stores the case weight of the inventory items.

Of course, the inventory data can be formatted and arranged in any other manner desired (such as by rows rather than columns, by blocks or pages for respective inventory items, and the like). Also, other additional inventory information can also be provided on the spreadsheet 120. For example, the spreadsheet 120 can contain a breakable item column, a special packaging column for items such as bags and boxes, a specific neighbor column for items requiring specific items nearby or away (such as meat packages that should be kept away from ice-cream packages, even though both are freezer items, while condiments can be kept near each other), a usage column for items that are used more frequent than others, and the like.

In addition to the dimensions given by the user, the orientation of the inventory item can also determine how the inventory items are stacked. Therefore, columns such as a vertical storage column 160 can also be included on the spreadsheet 120. The vertical storage column 160 allows for vertical storage and non-vertical storage. Specifically, depending on the size and shape of the inventory item, rearranging its orientation may save linear space on a shelf. For example, if one type of inventory item is a box 5" high and 20" long, a 48" tall shelf with 22" open space would be sufficiently large to store eight boxes: two stacks of four boxes each. However, if the boxes are turned on their sides, the same spacing allows for nine cases in one stack.

In some embodiments such as the illustrated embodiment, the spreadsheet 120 also has a stack quantity column 164 that lists (for each inventory item) the number of boxes allowed to be stacked on top of one other without damage to the inventory.

In some embodiments, the spreadsheet 120 includes one or more sorting code columns 168. The sorting code column(s) 168 can store product codes based upon like products, inventory characteristics or types, areas within a store, warehouse, or other facility where the inventory is stored, special storage requirements, frequency of item usage or consumption, and other factors. By way of example only, sorting codes can include "CL" for cooler items, "DS" for dry storage items, "FC" for front counter items, "FZ" for freezer items, "DT" for drive-thru items, "WS" for workstation items, and "JC" for janitorial or other chemical items as shown in FIG. 2.

The spreadsheet 120 (or other suitable application) provides the user with a manner in which to input inventory items and inventory item characteristics into the model 100. In this regard, although a user can input this information via a keyboard, mouse, or other user-manipulatable control, this information can instead be received from another source, such as from another computer, a disc or other memory media, and the like.

As will be described in greater detail below, the inventory information input into the spreadsheet 120 (or other suitable application) is employed to determine the manner in which the inventory can be arranged in an efficient manner on one or more shelves. In different storage and display environments, different inventory item characteristics determine the manner in which the inventory items are stored and displayed. Accordingly, any combination of inventory item characteristics can be employed as desired, including any one or more (or even none) of the various inventory item characteristics described above (e.g., length, depth, height, weight, vertical storability, stackability, storage environment). The spreadsheet 120 can therefore appear much different than that illustrated in the figures, and can contain significantly different types and combinations of inventory item characteristics as desired. The inventory item characteristics in the model 100 illustrated in the figures are employed by way of example only.

In some embodiments of the present invention, inventory of all types are entered on the spreadsheet 120, including inventory that will not be stored on the same shelving or location. In such cases, the inventory can be sorted in any manner desired, such as by inventory location as described above (using the inventory sorting codes) or by any other inventory item characteristic. By way of example only, it may be desirable to store all inventory of a certain season on one or more shelves, and all inventory of another season on one or more other shelves. This can be accomplished by identifying the inventory items with a seasonal inventory item characteristic, and then by sorting the inventory items by seasonal type. As another example, it may be desirable to store all large items on one or more large shelves, and to store smaller items on one or more smaller shelves. This can be accomplished by sorting the items by case length, case depth, or case height in the illustrated embodiment. Still other manners of sorting inventory items are possible based upon any number of other inventory item characteristics, each of which falls within the spirit and scope of the present invention.

With reference again to the embodiment of the present invention illustrated in the figures, after the inventory information has been entered in the spreadsheet 120, and after the entries in the sorting code column 168 have been entered, the inventory is sorted. The inventory can be sorted on the spreadsheet 120, and/or can be copied to any number of other locations, such as to different sheets represented by tabs 128 in FIG. 2. Information can be copied as just described in any conventional manner, such as by links built into the spreadsheet 120.

In some cases, it may be desirable to re-sort inventory items, such as by sorting a sub-group of inventory items based upon one or more other characteristics of the sub-group. In this regard, any number of re-sorting can be performed to group and sub-group inventory items as desired. Conversely, although sorting items input into the spreadsheet 120 can provide a number of advantages, sorting is not a requirement of the present invention.

Figure 3:
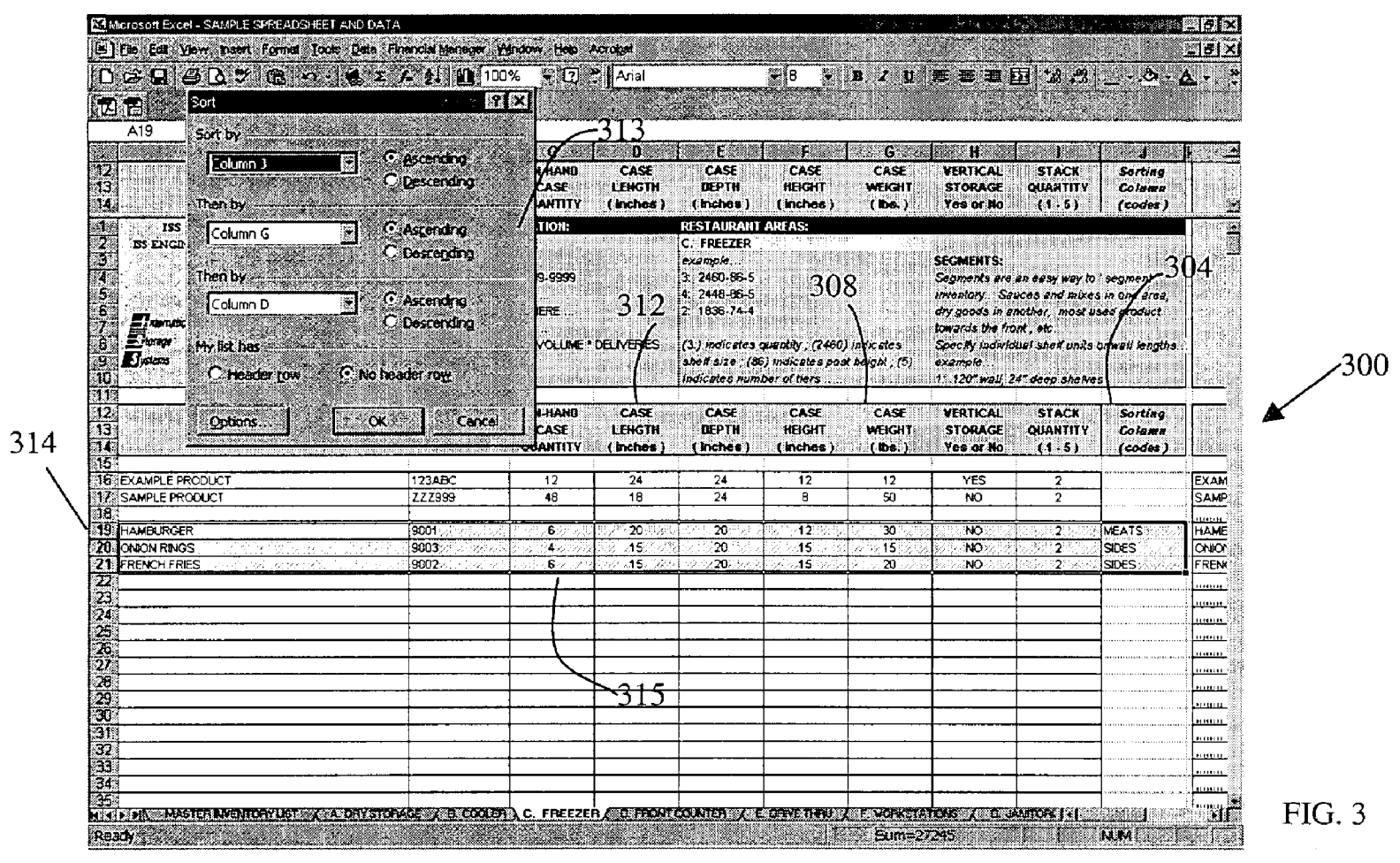
Figure 4:
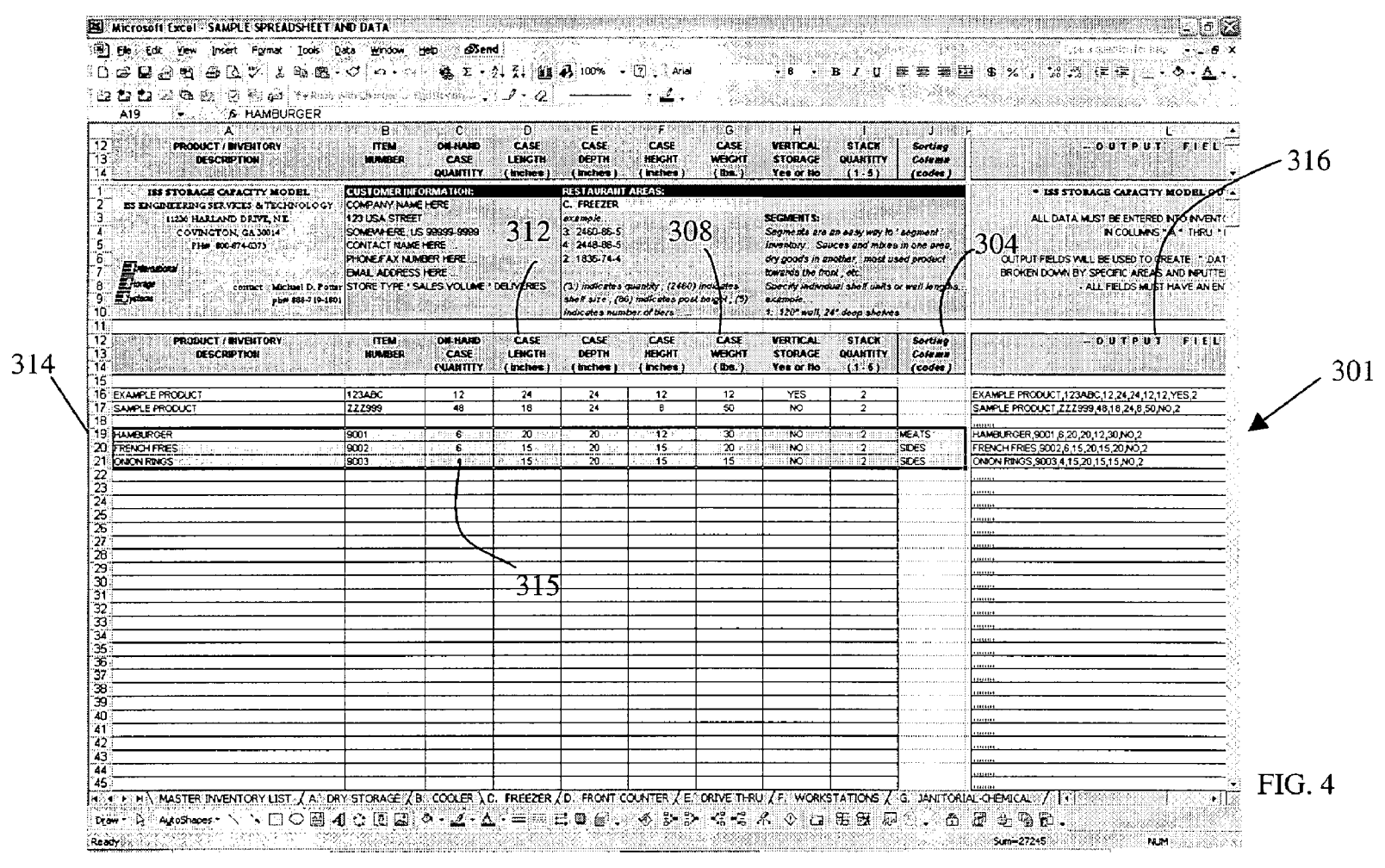

With reference to the illustrated embodiment, in an example of inventory sorted by the model 100, all dry storage items are grouped together in a dry storage tab sheet, all freezer items are grouped together and further sorted in a freezer tab sheet 300 as shown in FIG. 3. FIG. 3 also shows that the columns can be first sorted by a sorting code column 304 (column J), followed by a case weight column 308 (column G), and a case length column 312 (column D) in a pop-up sort window 313 or other user interface as desired. A sorted freezer tab 301 is shown in FIG. 4, wherein the sorting is performed using the criteria listed in the pop-up sort window 313.

Figure 3A:
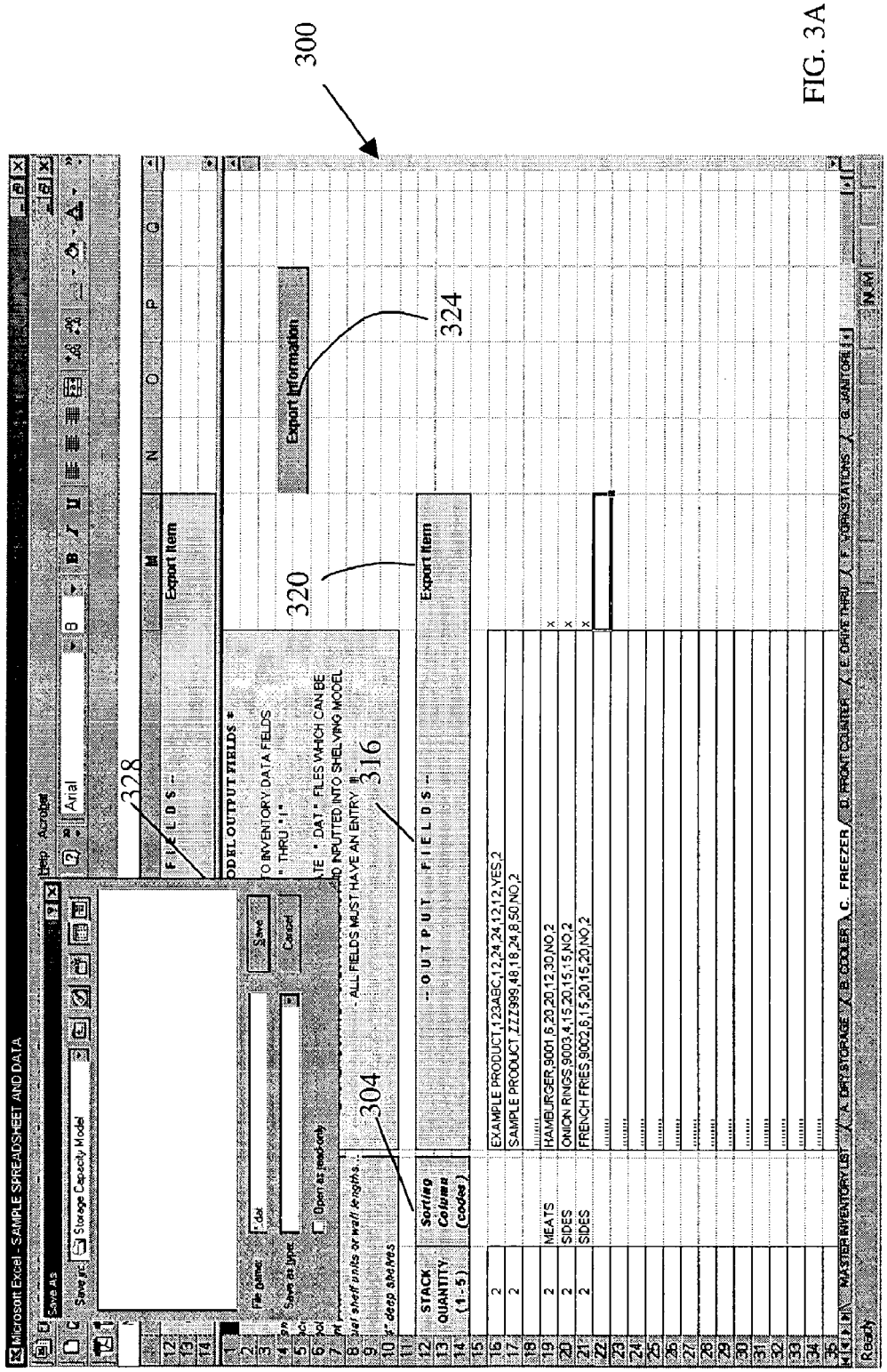
FIG. 3A is the exemplary spreadsheet of FIG. 3 showing a plurality of extra columns.

In some embodiments, the order of sorting and re-sorting can be changed as desired, such as by prompts provided to the user as shown in FIG. 3, by pull-down menus, or in any other manner. In some cases, the user can choose to use the unsorted data, as shown in FIG. 3 and FIG. 3A. In such cases, the programs 108 can arrange the data (as will be discussed in greater detail below) based upon the unsorted order in which the data is presented on the spreadsheet 120 or can arrange the data based upon pre-defined priorities. For example, the programs 108 can have a case size default priority so that if the inventory data entered in the spreadsheet is not sorted by a user, the programs automatically arrange the data based upon inventory size. Any other default priority (or combinations of different default priorities) can be employed as desired. If desired, these priorities can be capable of overwriting other sorted orders (including those specified by the user while sorting inventory as described above). For example, if the sorted data ranks two items identically (e.g., two items having the same size, but also having other different characteristics such as weight, stackability, etc.), one or more pre-defined priorities of the programs 108 can determine the order in which the items will be arranged. Examples of both sorted data (FIG. 4) and unsorted data (FIG. 3A) are discussed hereinafter.

Depending at least partially upon the applications employed to input and display the inventory information and to calculate and display one or more shelving units (for storing and/or displaying the inventory), it may be necessary to place the inventory information in a format that is readable by another application. Although this process is not required in some cases, FIG. 3A (unsorted) and FIG. 4 (sorted) provide examples of such a data conversion. In particular, the spreadsheet 120 employed in the illustrated embodiment includes an output field column 316 in which the inventory item information (sorted or otherwise) is input or generated in a format compatible with a CAD application.

Each cell of the output field column 316 lists in American Standard Code for Information Interchange ("ASCII") text and in comma separated value ("CSV") format item information for each inventory item input on the spreadsheet 120. This item information needs not include every item characteristic input for a particular inventory item, and in some cases can include only those item characteristics selected by a user. However, in the illustrated embodiments of FIG. 3A and FIG. 4, all of the inventory item information is included in the entry of column 316. Specifically, each entry in the output field column 316 includes the inventory description, followed by the corresponding item number, the on-hand case quantity, the case length, the case depth, the case height, the case weight, the vertical storage possibility, and the stack quantity for a corresponding inventory item. Some or all of this information will be employed to calculate a desired arrangement of inventory on one or more shelves as will be described in greater detail below.

In some embodiments, the storage capacity model 100 can be employed to determine arrangements (on shelves) of inventory selected by a user on the spreadsheet 120 (rather than determining inventory arrangements for all inventory items on the spreadsheet 120). In these embodiments, a user can select the inventory items for which an inventory arrangement is desired, such as by inputting a character into a field corresponding to the selected inventory item as shown in FIG. 3A (see export item column 320), marking an indicator button or box corresponding to the inventory item, highlighting the inventory item in any other manner, and the like. The storage capacity model 100 will therefore generate an inventory arrangement of only the inventory items selected by the user. For example, in the exemplary spreadsheet shown in FIG. 3A, the items "hamburger," "onion rings," and "french fries" were selected by a user placing "x" characters into the cells of the export item column 320. With these items selected in both the sorted and the unsorted examples, the storage capacity model 100 will determine one or more arrangements of the hamburger, onion ring, and french fry cases on one or more shelves.

To initiate the process of determining inventory arrangements, the user can input a command into the storage capacity model 100, such as by pushing an export information button 324 as shown in FIG. 3A (not shown in FIG. 4), or by operating any other user-manipulatable control associated with the spreadsheet 120 or other user interface of the storage capacity model 100. Alternatively, this process can be initiated automatically by user input of the inventory data (described above) into the spreadsheet 120, by indicating desired inventory items to be run (e.g., by indicating the selection of inventory items in export item column 320), and the like.

As a result, the inventory information (whether in original form or formatted into another form as described above, and whether sorted or unsorted) can be saved to a file or other storage area for later use, can be sent to another application for calculating and determining an inventory arrangement as described below, or can be referred to by the same application in which the inventory data is input in order to calculate and determine an inventory arrangement as described below. By way of example only, the selected inventory items in the illustrated embodiment are exported to a CSV ASCII text file by pushing an export information button 324. The spreadsheet application 104 can prompt the user for a filename and/or directory information in a pop-up window 328 or other user interface.

Referring again to FIG. 1, after the inventory data has been selected (e.g., through a spreadsheet application 104 as described above), and the inventory data has been formatted (in those embodiments in which such formatting is performed), the storage capacity model 100 uses one or more programs 108 to process the text file generated. In the illustrated embodiment described above, the inventory data in CSV ASCII format is saved to a data file and is referred to by software programs 108 to process the inventory data. Also in the illustrated embodiment, the software programs 108 include a shelving routine (ISS-SH) 172 and a virtual environment generating routine (ISS) 176. The software programs 108, 172, 176 can be of any type, and in some embodiments are compatible with the OpenDWG Alliance drawing exchange format ("DXF") standards.

The shelving routine (ISS-SH) 172 is configured to manually build one or more shelving units based upon a predefined shelf design and user input. In some embodiments, the shelving routine (ISS-SH) 172 is configured to operate in a plurality of operating modes based on the user inputs, such as in a "stand-alone" mode in which a user can input shelving parameters (e.g., shelf width, depth, and height, the number of supports for the shelf, the number of shelves per shelf rack, and the like) to generate 2D and/or 3D images of shelves and shelving systems. Also, in some embodiments the shelving routine (ISS-SH) 172 can also operate in an automated mode to utilize inventory data (e.g., inventory data selected by a user in spreadsheet 120) to determine an arrangement of inventory on one or more shelves. In the automated mode, the shelving routine 172 can interact with the virtual environment generating routine (ISS) 176 to create shelving components required for the storage capacity model 100. The details of these operating modes are explained hereinafter.

With continued reference to the "stand-alone" mode of operation of the shelving routine 172 mentioned above, the storage capacity model 100 can enter the stand-alone mode when the user invokes the shelving routine (ISS-SH) 172 in an interactive area 124 of FIG. 1, or by one or more user controls or interactive areas in any other desired location of the model 100. In the illustrated embodiment, the virtual environment generating routine 176 is invoked, and has an interactive area 124 in which a user can input commands and data in the generation of an inventory arrangement by the storage capacity model 100. By way of example only, an extended interactive environment 500 of the interactive area 124 (see FIG. 5) is entered with an "ISS-SH" command 504 entered by the user, which invokes the stand-alone mode of the shelving routine 172 to create models of shelving units based on user-entered inputs and predefined shelving parameters. Alternatively, the shelving routine 172 can be initiated in any other manner desired.

The interactive area 500 of the CAD application 112 can enable users to enter desired shelving data, limitations, and parameters in any manner desired, such as in windows, data entry lines, and the like. In the illustrated embodiment for example, a user can enter shelving information in response to prompts generated by the shelving routine in the interactive area 500. For example, and with continued reference to the exemplary interactive area 500 illustrated in FIG. 5, a user has entered a "48" when a shelf width prompt 508 was displayed, a "24" when a shelf depth prompt 512 was displayed, an "86" when a post height prompt 516 was displayed, a "5" when a number of shelves prompt 520 was displayed, and a "4" when a number of legs prompt 524 was displayed. For example, the 'shelf depth' 512 in the illustrated embodiment automatically defaults to a cubic area calculation, although the user can specify another shelving depth desired, such as when the user is preparing layouts based upon existing shelving units and areas. In some cases, the prompts 508, 512, 516, and 524 can include predefined or suggested shelving parameters (e.g., see FIG. 5). In other cases, such predefined or suggested shelving parameters are not included (e.g., see prompt 520 in FIG. 5).

After shelving parameters have been entered as just described, a 2-D or 3-D model of the shelving is generated by the CAD application 112. In some embodiments, a set of pre-defined parameters for individual shelving components is retrieved from memory accessible by the CAD application 112. The CAD application 112 thereafter uses these parameters as a basis to draw the various individual shelf components on the display, thereby forming the entire shelving unit. This shelf building technique allows the CAD application 112 to have a relatively low file size and can easily give the user significant customizing control over the shelving components (i.e., enabling a user to easily change the length of supports to be drawn by the CAD application, to choose and draw components having non-standard dimensions, and the like).

Figure 6:
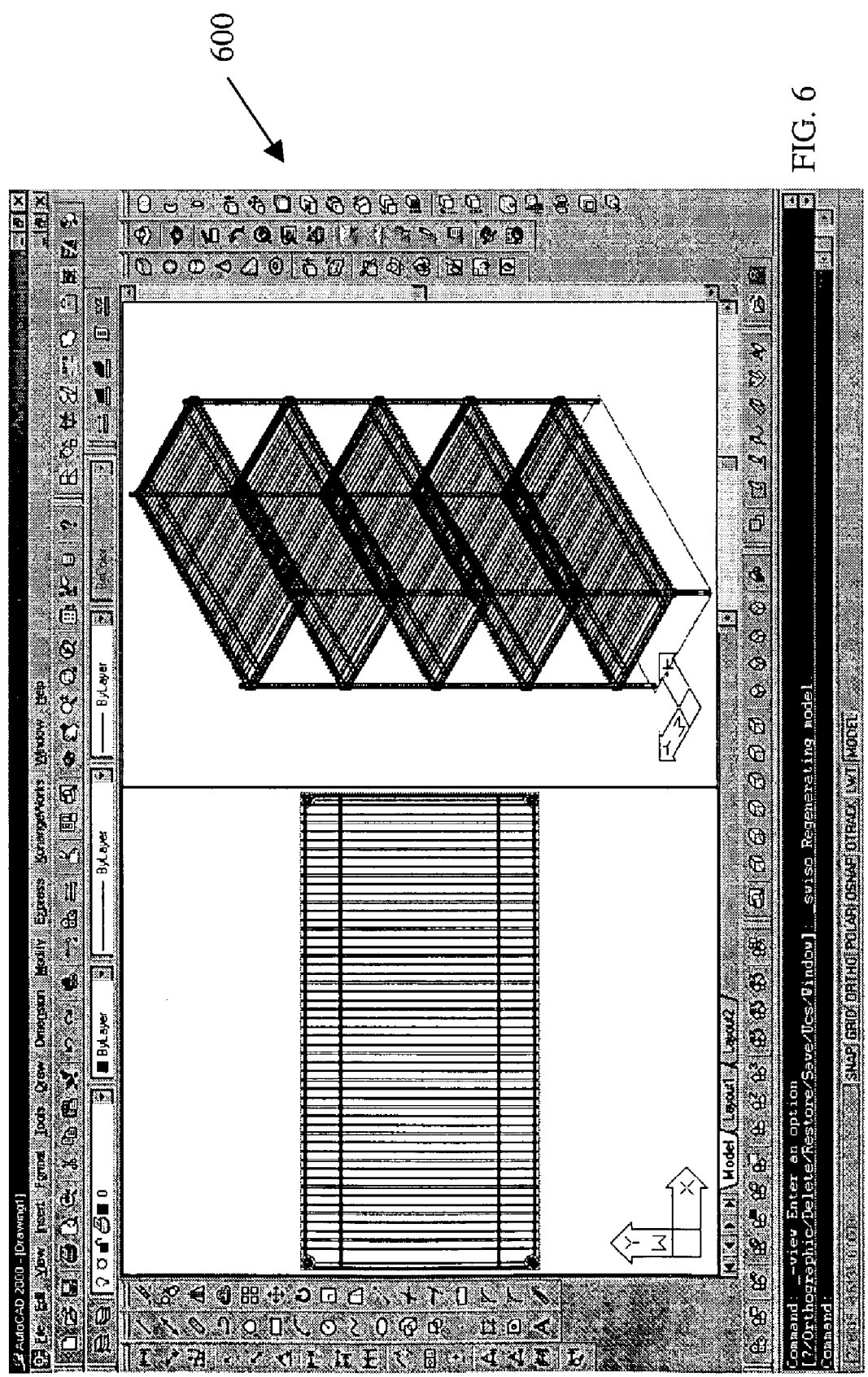
FIG. 6 is an exemplary shelving model generated by the commands listed in FIG. 5.

Alternatively, the model 100 can retrieve data for displaying pre-drawn components and/or assemblies, such as through a database of standard and/or non-standard shelving components stored in memory accessible by the CAD application 112. This information can be a database of standard and non-standard shelf assembly components offered for sale by one or more manufacturers. The shelving parameters entered by the user can be compared to the data corresponding to the shelving components in such a database (or other memory accessible by the CAD application 112). Shelving component drawing information corresponding to the shelving parameters can then be retrieved by the CAD application 112 for display of the shelving components. FIG. 6 shows a resulting model 600 using the parameters the user has entered in the exemplary embodiment described above.

As indicated above, the shelving routine (ISS-SH) 172 can operate in a "stand-alone" mode in which shelf assemblies can be generated and displayed for view by a user, and an automated mode to utilize inventory data (e.g., inventory data selected by a user in spreadsheet 120) to determine an arrangement of inventory on one or more shelves. In the automated mode, the ISS 176 generates a virtual environment for the shelves and inventory items input into the spreadsheet 120 or otherwise selected in any other manner to be arranged upon the shelves. The ISS 176 can also increase the storage capacity of shelving by generating a virtual inventory based on the inventory data received (i.e., the CSV data in the illustrated embodiment), and by calculating the cubic volume required for the items based upon area, stackability, and orientation of the items.

An example of the model 100 running in an automated mode will now be described. As an alternative to the stand-alone mode described above, the storage capacity model 100 can enter the automated mode when the user invokes the shelving routine (ISS) 172 in an interactive area 124 of FIG. 1, or by one or more user controls or interactive areas in any other desired location of the model 100. As described above, in the illustrated embodiment, the virtual environment generating routine 176 is invoked, and has an interactive area 124 in which a user can input commands and data in the generation of an inventory arrangement by the storage capacity model 100. By way of example only, an extended interactive environment 500 of the interactive area 124 (see FIG. 5) is entered with an "ISS" command entered by the user (rather than an ISS-SH command as shown in FIG. 5), which invokes the automated mode of the shelving routine 172. Alternatively, the automated mode of the shelving routine 172 can be initiated in any other manner desired.

Figure 7:
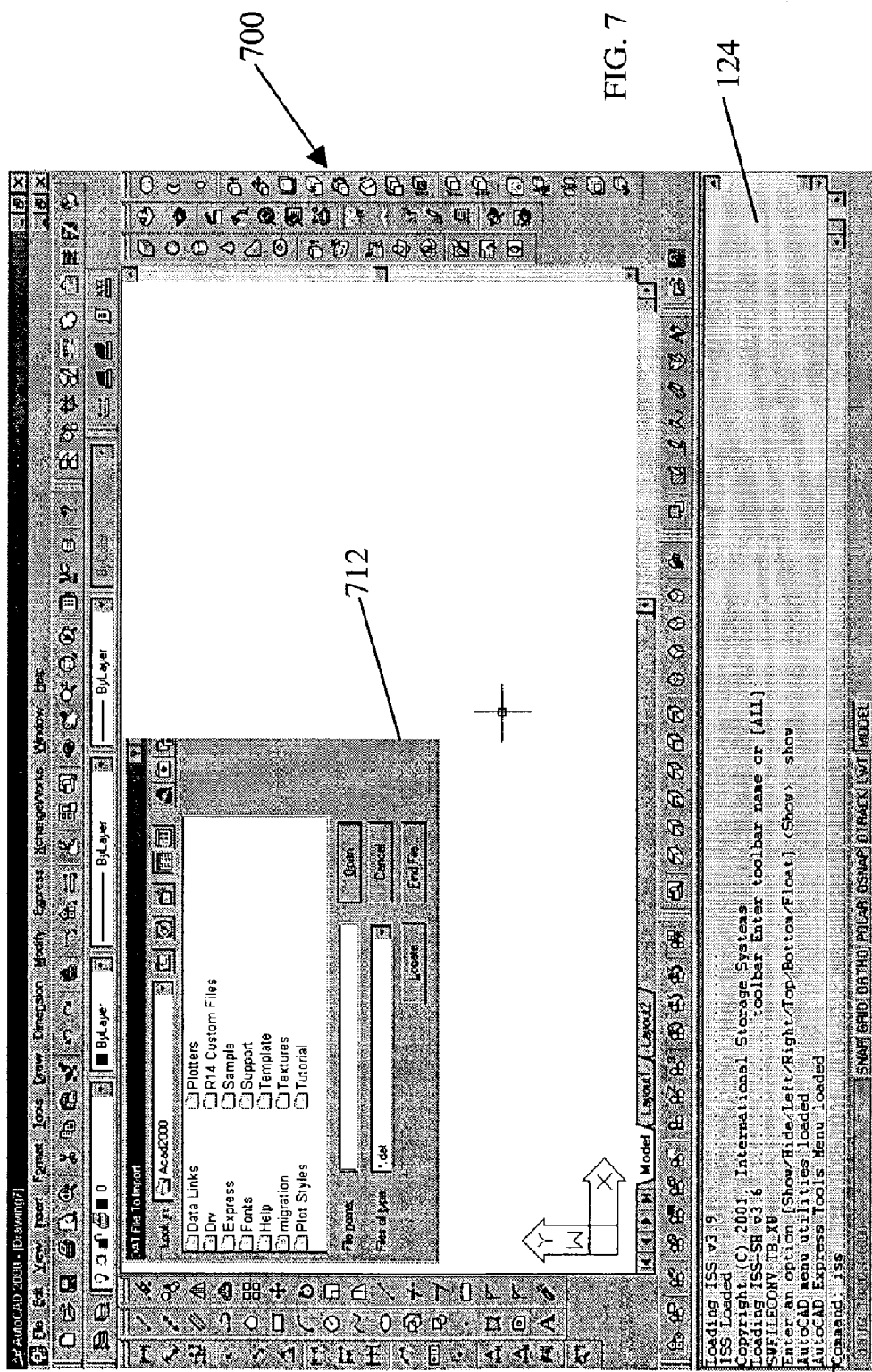
FIG. 7 is an exemplary computer-aided design ("CAD") display with a pop-up window showing a plurality of file directories.

With reference to FIG. 7, the virtual environment generating routine (ISS) has been invoked by the user via the interactive area 124 of the AutoCAD screen 700. In the illustrated embodiment, when an "ISS" command 704 is entered (or another command indicating that an inventory shelving arrangement is desired by a user), a pop-up window 712 is displayed. The pop-up window 712 prompts the user for a CSV data file location. Once the CSV data file is located and opened, the ISS 176 will generate the virtual inventory and will prompt the user for more specific information. In other embodiments, the data file containing inventory information for which an inventory shelving arrangement is to be run can be identified in any other manner, or can automatically be loaded upon user entry of the inventory data.

Figure 7A:
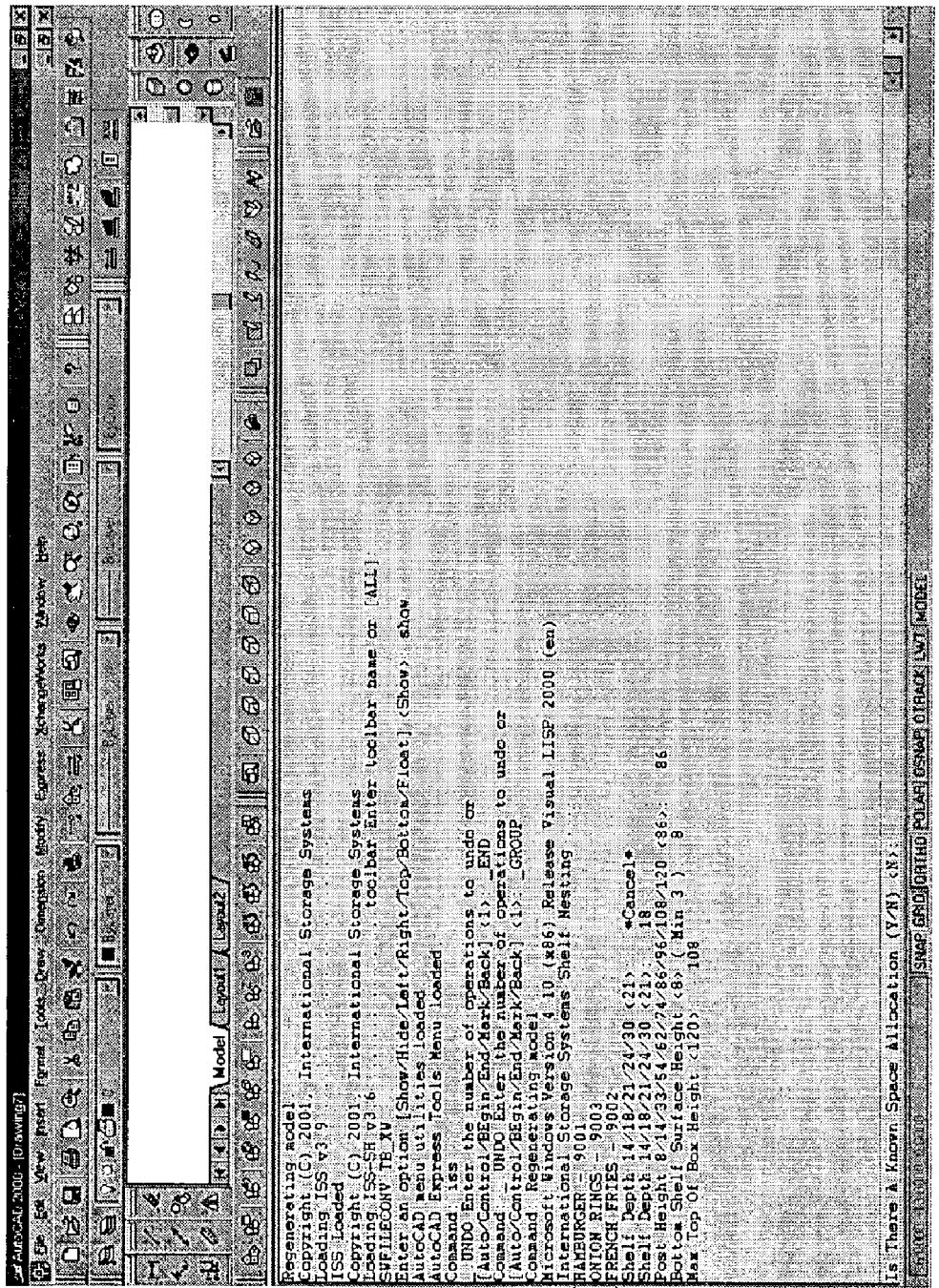
FIG. 7A is the exemplary CAD as shown in FIG. 7 showing an extending view of an interactive area.

With continued reference to the illustrated embodiment, once a data file containing inventory information (e.g., a CSV formatted data file) is opened, the virtual environment generating routine 176 can create a virtual inventory 716 as shown in FIG. 7A, and can prompt the user for more specific information regarding the shelf parameters desired to store and/or display the inventory. For example, after the virtual inventory 716 information is displayed, the virtual environment generating routine 176 can prompt the user for a desired shelf depth, post height, bottom shelf surface height, and maximum top of box height. For each prompt, the virtual environment generating routine 176 can also provide a default value, if desired. For example, the default value of shelf depth can be 18 inches.

In some embodiments, the virtual environment generating routine 176 will also prompt the user for a presence of a known space allocation (i.e., a constraint affecting the permissible size of the resulting shelving assembly), in which the user can input the amount of linear space available for the shelves, the available depth for the shelves, the available footprint (e.g., in square feet) of the shelves, or any other shelf assembly size constraint desired. In some embodiments, if the virtual environment generating routine 176 determines that the shelf limits provided by the user are too small during the virtual shelving process, the virtual environment generating routine 176 generates an error message and prompts the user for additional shelf space. However, if there is no known space allocation, the virtual environment generating routine 176 can perform the virtual shelving process based upon the inventory data with a plurality of fixed shelving constraints. More detail regarding the virtual environment generating routine 176 and space allocation is explained below.

In some embodiments of the present invention, the shelving routine (ISS-SH) 172 performs the virtual shelving process in a series of steps involving a number of comparisons of individual inventory items to available space in a virtual shelving unit. In this process, several iterations can be performed in which the shelving routine 172 shelves the inventory items in different orientations and/or positions in the shelving unit in order to determine the storage efficiency of each inventory arrangement. Examples of such an iterative process will now be described.

Generally, the user has the option to sort the inventory data based upon different preferences and needs. For example, if inventory weight is considered first (i.e., the first consideration by which a user of the model 100 desires to arrange the inventory on shelving), the sorted list will include the heavier items in the beginning. After the sorted inventory data and the shelving data have been loaded into the shelving routine 172, the virtual shelving process can execute as follows. The shelving routine 172 reads in the inventory information (e.g., starting from the top of the inventory list created in the spreadsheet 120 down) and allocates the inventory on virtual shelving starting from the bottom of the virtual shelving up. In this manner, the inventory is virtually shelved by the shelving routine 172. Employing the user preference of inventory weight described above (by way of example only) the heavier inventory items are allocated (placed) at the bottom of the shelving unit(s) while the lighter inventory items are allocated (placed) at higher positions on the shelving unit(s).

In some embodiments, the user can be given the option of rearranging the orientation of the inventory items, such as by manually manipulating inventory item length, height and width (e.g., in the spreadsheet 120). For example, if a case of cups is 24" long×24" deep×36" tall, the case can be laid on its side, and can be dispensed from the top of the case while on the shelf (whereby the case depth and width can be specified as 36" and 24", respectively). In this example, the case can even overhang the front edge of the shelving unit, if desired.

Although the inventory items can be sorted prior to the virtual shelving process performed by the shelving routine 172 and the virtual environment generating routine 176 as described herein, the inventory items need not necessarily be sorted. In addition, in some embodiments the shelving routine 172 is not limited to allocating inventory items in a top-down order (from the spreadsheet 120 as described above), or to allocating virtual shelf space from the bottom of a virtual shelf assembly to the top. In some embodiments, the directions in which either or both of these procedures are performed can be adjusted by the user as desired, whether independently or dependently of each other. Also, in some embodiments other types of allocation are possible, such as left to right or right to left on all shelves in a virtual shelf assembly.

In the illustrated embodiments, once the shelving routine 172 has determined which inventory item to virtually shelve first, the shelving routine 172 chooses one of the case dimensions as a case linear space (with the rest of the case dimensions being assigned a case vertical space and a case depth space). For example, when the shelving routine 172 chooses the case length as the case linear space, the shelving routine 172 can assign the case height as the case vertical space and the case width as the case depth space. The case length and width are then compared to the available space of a bottom shelf whose length and width parameters have already been set as described above. These length and width parameters can be stored in any type of volatile or non-volatile memory prior to this comparison. If the case length and width do not exceed (or unacceptably exceed) the length and width available on the shelf, the first inventory item is allocated a space (i.e., virtually shelved) on a bottom shelf of a virtual shelving assembly, such as a space on the left-most location of a bottom shelf. In this regard, the shelf space occupied by this inventory item can be subsequently subtracted from the corresponding shelf dimensions.

In some embodiments, the shelving routine 172 considers an inventory item properly fit on a shelf when the case length and the case depth are less than or equal to the available shelf length and shelf depth, respectively. The shelving routine 172 can also consider an inventory item to fit on a shelf when the case length and/or depth is less than or equal to the available space on the shelf, or is within a user-definable overhang tolerance (which can be a percentage of the shelf depth), thereby permitting inventory items to overhang the sides, front, and/or back of the shelf, if desired. For example, the shelving routine 172 in the illustrated embodiments can consider an inventory items to fit on a shelf when the case length is less than or equal to the available shelf length and/or the case depth is within a user-definable overhang tolerance. The user-definable overhang tolerance can be dependent on the weight of the inventory, the case depth or width, the shelf depth or width, or upon any of the inventory item parameters desired.

Once the first inventory item has been allocated a space on a virtual shelf having the dimensions determined as described earlier, the shelving routine 172 can repeat the space allocating process just described for the next inventory item selected to be shelved. In this next step, the shelving routine repeats the above-described allocation process at a location immediately beside the inventory item just virtually shelved. This location can be beside the inventory item just shelved, can be behind or in front of the inventory item just shelved, or can even be on top of the inventory item just shelved, based upon pre-defined shelving parameters of the shelving routine 172.

In the illustrated embodiment for example, the shelving routine 172 compares the available space in front of and behind the inventory item just shelved to the case depth of the next inventory item to be virtually shelved. If this available space is less than or equal to the case depth (or is within an acceptable overhang tolerance), the shelving routine will allocate that space to the next inventory item. Otherwise, the shelving routine 172 will compare the case length of the next inventory item to the available shelf length adjacent to the inventory item just shelved. If this available space is less than or equal to the case depth (or is within an acceptable overhang tolerance), the shelving routine 172 will allocate that space to the next inventory item. Otherwise, the shelving routine 172 will either check the available space on top of the inventory item just placed (if the indicated stack quantity for the inventory item permits), or will generate a higher shelf upon which the next inventory item can be virtually placed.

It should be noted that although the steps of comparing the various inventory item dimensions are described above in a particular order, the virtual shelving process can be carried out by the shelving routine in other manners as well (or in addition), such as by checking the available space for the next inventory item on top of an inventory item just placed before checking the available space in front of, behind, or adjacent the inventory item just placed, by always checking the available space for the next inventory item beside an inventory item just placed before checking other locations of available space, and the like. In some embodiments, the shelving routine 172 completes different iterations of shelving employing such different space-checking priorities in order to compare which iterations produce more efficient shelving arrangements.

One example of the decision process of the shelving routine 172 as just described is provided with reference to the figures. Six cases of hamburgers (314 of FIG. 3 or FIG. 4) are to be shelved on a shelf having three tiers, each tier being 54" long×18" deep. Each of the cases is 20" long×20" deep×12" tall, and the cases cannot be stored on their sides or ends. In this example, the shelving routine 172 first chooses a case dimension to be the case linear space, and also chooses a case depth space. If the case length of 20" is chosen as the case linear space and the case depth of 20" as the case depth space, then the case height of 12" is assigned the case vertical space. After the first case of hamburgers has been allocated to a position on the bottom shelf, the updated shelf front linear space is 34", the updated shelf depth space is –2" (or an overhang of 2"), and the updated shelf vertical space is 14". The overhang in the example is 11.1% of the shelf depth, and 10% of the case depth.

After the first case has been placed on the shelving using one of the dimensions as the case linear space, the shelving routine 172 continues the shelving process with the quantity information from the on-hand case quantity column (e.g. 140 of FIG. 2, 315 of FIG. 3, or 315 of FIG. 4). The shelving routine 172 continues to place the cases on the shelves in a placement direction. For example, the placement direction can be along the shelf, thereby allocating shelf space from left to right on the shelf.

In the previous example, after the first case of hamburgers is allocated to a space on the left side of the bottom shelf (and after the overhang is checked as being acceptable), the second case of the hamburgers is placed on the right side of the first case. The updated shelf linear space along the length of the shelf is 14", and the updated shelf depth space is again –2" (or an overhang of 2").

As suggested above, in some embodiments (such as when smaller case sizes are employed) the shelving routine 172 can allocate shelf space in a second placement direction. For example, the inventory items can be placed in front of one another, such as inventory items arranged two or three deep on a shelf.

After reaching an end of the shelf (i.e., when the comparisons of item dimensions to remaining shelf space indicate that insufficient shelf space remains for allocation to the next inventory item to be shelved), the dimension comparison and inventory item allocation process performed by the shelving routine 172 as described above can be continued in another direction, such as in a reverse direction along the same shelf (e.g., atop the cases just placed), in the same direction atop the inventory items just virtually shelved, in the same or a reverse direction on another shelf, in the same or a reverse direction to allocate space behind or in front of cases on the same shelf, and the like.

By way of example only, the shelving process of the same inventory can be repeated with a different placement orientation, such as shelving the inventory in the back of the shelf after placing the inventory from the left to the right on the shelf. The inventory item dimensions can be used as the linear space for each placement direction. Shelving of inventory items in the first inventory set can eventually be stopped when all the inventory items (or selected inventory items) have been shelved, or when the available shelf space on the shelf is less than that required by the next inventory item to be virtually shelved (in some embodiments, taking into account the maximum stack quantity (see FIG. 3A or FIG. 4), any limitation upon whether the cases can be stored on their sides or ends, and other factors). If there is insufficient space available on the shelf for the first inventory set, the shelving routine 172 can continue the shelving process of the first inventory set on a higher shelf generated by the shelving routine 172 and the virtual environment generating routine 176 and can attempt to shelve inventory items from other inventory sets in the remaining space on the partially-full shelf. If the number of stacked items reaches the quantity stated in the stack quantity column in FIG. 3A or FIG. 4, another shelf can be assigned a space over the current shelf, along with a user-definable clearance beneath the new shelf.

With continued reference to shelving example illustrated in the figures, since there is insufficient space behind the first two cases of hamburgers for a third case of hamburgers, the third case of hamburgers is placed on top of the first case of hamburgers. Similar placement is performed for a fourth case of hamburgers. The updated shelf linear space in the front is 14", and the updated shelf depth space is –2" (reflecting an overhang of 2"). If the inventory allows for storage of cases on their sides or ends, a fifth case of hamburgers can be placed on its side to the right of the second and the fourth cases of hamburgers. However, in this example, the inventory of hamburgers does not allow for such case storage as indicated in the vertical storage column 160 of the spreadsheet 120 in FIGS. 3, and 4. Furthermore, the remaining inventory sets (listed in FIGS. 3 and 4) have cases that are 15" long×20" wide, and cannot therefore be placed on the bottom shelf. The number of stacked cases of hamburgers has reached two (the maximum stack quantity in FIG. 3). Therefore, a 1" thick second shelf is assigned with a 2" underside clearance at 34" above the ground. As a result, the fifth and sixth cases of hamburgers will be placed on the second shelf.

For each of the dimensions associated with the inventory already shelved, and for each placement direction, the cases of a second inventory (e.g., cases of onion rings) set on the inventory list can be placed on the same or additional shelves in a manner similar to that described above for the first inventory set shelved (e.g., cases of hamburgers). Specifically, the shelving process of the second inventory set can be the same or substantially the same as previously described. In other words, the shelving process chooses a new case linear space from the second inventory set, and begins to allocate space for the new inventory items in the second inventory set even if other items are already placed upon the current shelf. The shelving process can then be repeated for any or all placement directions and for all items desired.

Since other items may be already virtually placed upon the shelf, the shelving routine 172 can proceed in a different manner to arrange the remaining items. For example, the shelving routine 172 can virtually stack remaining items (in a second inventory item set) such that like items only sit atop each other. Alternatively, the shelving routine 172 can place at least some of the remaining items atop heavier items already allocated space to a shelf. Of course, the shelving routine 172 can have other options for placing items of different inventory sets such that overall shelving efficiency is improved.

With continued reference to shelving of the unsorted inventory illustrated in FIG. 3A, the onion ring cases are placed upon the second shelf as follows. If the two cases of hamburgers are placed side by side, the updated shelf linear space along the length of the current shelf being filled is 14", and the updated shelf depth space is –2" (reflecting an overhang of 2"). This arrangement does not allow any items of the second inventory set (i.e., the onion ring cases) to be placed on the second shelf if unlike items are not allowed to be stacked atop one another (a default parameter that can be changed in some embodiments of the present invention). However, if the two cases of hamburgers are stacked in a second possible arrangement, the updated shelf linear space along the length of the current shelf is 34", and the updated shelf depth space is –2" (reflecting an overhang of 2"). In operation of the storage capacity model 100, both arrangements can be automatically generated by the shelving routine 172 and the virtual environment generating routine 176, along with still other options for virtually shelving the cases of onion rings.

The second arrangement of onion ring and hamburger cases on the second shelf allows for a placement of four onion ring cases on the second shelf. Therefore, the updated shelf linear space along the length of the second shelf is 4", and the updated shelf depth space is −2" (reflecting an overhang of 2"). The stack number of the onion ring cases has reached two (on the second shelf), which is the maximum stack quantity for onion rings as indicated in FIG. 3. Therefore, a third shelf is generated by the shelving routine 172 and the virtual environment generating routine 176, and is assigned with a 2" clearance at 67" above the ground.

With reference now to the sorted inventory as illustrated in FIG. 4, the arrangement of items in the second shelf (after the hamburger cases are virtually shelved as described above) is very similar. That is, if the two cases of hamburgers are placed side by side, the updated shelf linear space along the length of the second shelf is 14", and the updated shelf depth space is −2" (reflecting an overhang of 2"). This arrangement does not allow any of the second inventory set (french fries, in the sorted inventory embodiment of FIG. 4) to be placed on the second shelf if unlike items are not allowed to be stacked together. However, if the two cases of hamburgers are stacked, the updated shelf space along the length of the second shelf is 34", and the updated shelf depth space is −2" (reflecting an overhang of 2").

This second arrangement allows a placement of four french fries cases on the second shelf. The updated shelf linear space along the length of the second shelf is 4", and the updated shelf depth space is −2" (reflecting an overhang of 2"). The stack number of the french fry cases has reached two, which is the maximum stack quantity for french fries as indicated in FIG. 4. Therefore, a third shelf is generated by the shelving routine 172 and the virtual environment generating routine 176 and is assigned with a 2" clearance at 67" above the ground.

The above-described virtual shelving process can continue until all inventory items (user-selected or otherwise) are shelved or until the shelving assembly generated by the shelving routine 172 and the virtual environment generating routine 176 can no longer receive additional inventory items. In this regard, a maximum top of box height setting can define a maximum inventory height on the generated shelving assembly in order to allow for different environments, such as walk-in storage facilities, dry storage areas, warehouses, and the like, and allows the users to comply with local fire codes for ceiling clearances.

In some embodiments, all the dimensions of the inventory items in each inventory set can be employed for calculating the linear space for shelving as described above, unless the cases cannot be stored on their sides or ends. In other words, for each of the dimensions of an inventory set and for each placement direction, there are at least three different shelving scenarios using the inventory item length, the inventory item height and the inventory item width. For each scenario, a shelf linear efficiency can be calculated. Specifically, the shelving routine 172 can calculate the percentage of linear shelf space (along the length of the shelves in a shelving assembly generated by the shelving routine 172 and the virtual environment generating routing 176) allocated to inventory items, thereby establishing a shelving efficiency figure to which other shelf efficiency figures for other arrangements of inventory items can be compared by the module 100 or by a user thereof upon display or printout of such figures for the user. In other embodiments, the shelving routine 172 can calculate the percentage of shelf surface area or volume in the shelving assembly allocated to inventory items, thereby establishing other (possibly more accurate) types of shelving efficiency figures.

In some embodiments of the present invention, after the entire inventory (or the desired inventory) has been virtually shelved by the shelving routine 172 and the virtual environment generating machine 176 in one iteration, the shelving routine 172 and the virtual environment generating machine 176 can repeat the virtual shelving process described above with a different arrangement of inventory items. For example, the shelving routine 172 can automatically perform the same steps above using another case dimension as the case length (subject to constraints set upon the manner in which such inventory items can be oriented), can repeat this procedure for a single set of inventory items in order to generate another shelving arrangement, can repeat this procedure again for another set of different inventory items in order to generate another shelving arrangement, or can repeat this procedure again with multiple inventory items (in one shelving iteration) for yet another shelving arrangement.

Alternatively or in addition, the shelving routine 172 can repeat the above-described procedure using a different manner in which inventory items are virtually shelved or using shelves having different depths and/or lengths. For example, the above-described steps can be repeated, but instead employing a shelving procedure in which inventory items are first stacked upon one another on a shelf prior to being allocated new shelf space adjacent inventory items already placed. As another example, the above-described steps can be repeated, but instead employing a shelving procedure in which inventory items are first allocated space along a front or rear of a shelf's length before allocating space to the same or different inventory items behind or in front of inventory items already placed.

After a desired number of iterations have been executed by the shelving routine 172 and virtual environment generating routine 176 (each generating a different possible shelving arrangement) or after all possible shelving arrangements have been generated, the shelving routine 172 can display or print the results in a number of different manners. For example, the virtual environment generating routine 176 can display all arrangements generated, can display the linear, area, or volume shelving efficiencies of each arrangement generated, can display only the most efficient arrangement or arrangements generated, and the like.

Figure 8:
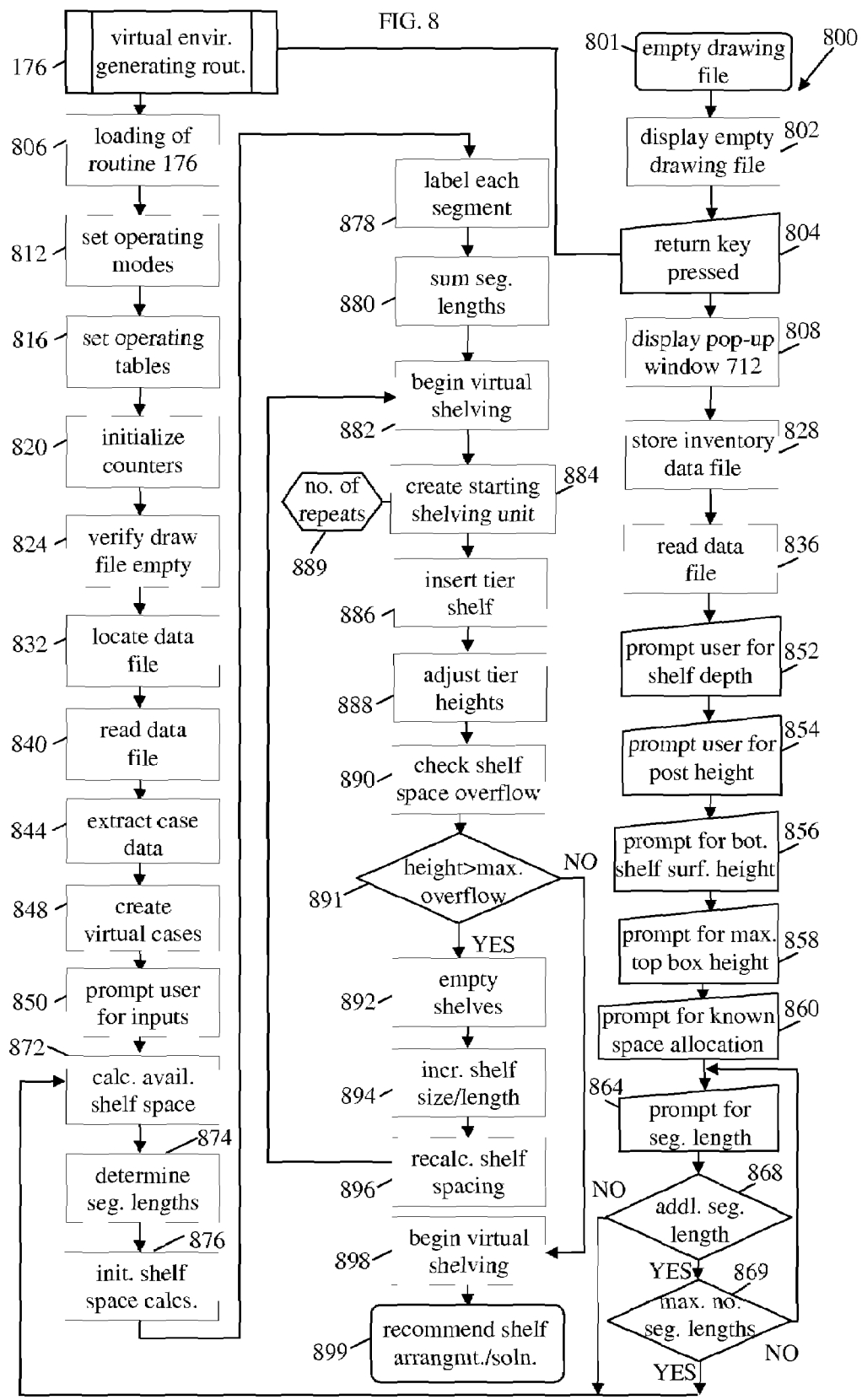
FIG. 8 is a flow charting of inventory arrangement program according to the present invention.

Referring now to FIG. 8, a flow chart 800 describing an exemplary virtual environment generating routine (ISS) 176 and its operations is shown. An empty drawing file 801 is first displayed at step 802. When the user needs to create item and shelving layouts, the user enters the "ISS" command in the interactive area 124 of the AutoCAD window 700 as described above. Once a return key is pressed at step 804 after the "ISS" command has been entered, the virtual environment generating routine 176 is loaded at step 806, and the pop-up window 712 is displayed at step 808. A plurality of operating modes and tables are thereafter set at step 812 and at step 816, respectively. After a plurality of counters are initialized at step 820, the virtual environment generating routine 176 will verify that the drawing file is empty at step 824. The user then proceeds via the pop-up window 712 to locate and select an appropriate location where the inventory data file (e.g., a CSV inventory data file in the exemplary embodiment described earlier) is stored at step 828. The virtual environment generating routine 176 then proceeds to locate the data file at step 832, and reads in the data from the file at steps 836 and 840.

The case data is thereafter extracted from the data at step 844, and is used to create a plurality of virtual single case entities at step 848.

Thereafter, the virtual environment generating routine 176 can prompt the user for inputs at step 850. By way of example only, the virtual environment generating routine 176 can prompt the user for a shelf depth at step 852 (with a plurality of options and a corresponding default value listed, in some embodiments). The virtual environment generating routine 176 can continue to prompt for additional desired shelving parameters, such as a post height at step 854, a bottom shelf surface height at step 856, a maximum top of box height at step 858, and/or a known space allocation at step 860.

At this stage in some embodiments, the virtual environment generating routine can inquire whether there is a known space allocation for the shelving to be generated. If so, (e.g., if a "Y" or "Yes" is entered by the user to indicate that there is a known space allocation for the shelving), the virtual environment generating routine 176 can enter a segment length option mode in which the user is prompted to enter segment lengths of shelving desired. Segment lengths can be individual shelving unit lengths or complete wall areas (such as by specifying 240 inches for a 20-foot long wall). In such cases, the virtual environment generating routine 176 can prompt the user for a segment length at step 864, and can determine if the user has entered an additional segment length at step 868. In some embodiments, steps 864 and 868 can be repeated until there is no additional segment lengths entered by the user or a maximum number of segments lengths has been entered (determined at step 869). It will be apparent to one skilled in the art that the virtual environment generating routine 176 can be configured to allow the user to enter as many segment lengths as desired.

Once it is determined that a maximum number of segment lengths has been entered at step 869, that no additional segment lengths are to be entered, or that there is no known space allocation, the virtual environment generating routine 176 will create the shelving units and place the inventory on the shelves as described in greater detail above (such as by allocating inventory items starting from left to right, bottom to top continuously in some embodiments). If a segment length has been entered that is too small to hold all the inventory items based upon the specified parameters, an error message can be displayed and the virtual environment generating routine 176 can automatically prompt the user to increase the desired shelving system to the next shelf size based upon predefined increments (e.g., available shelf sizes) or to otherwise increase the desired segment length until the inventory is capable of being received on the shelving unit or until one or more other parameters (such as the maximum top of box height, shelving unit height, and shelf depth) are changed.

When there are no additional segment lengths to be entered, or there is no known space allocation, the virtual environment generating routine 176 can enter an automated storage design option mode. Generally, the virtual environment generating routine 176 in the automated storage design option mode determines the available space from the shelving data (such as segment data), and generates virtual shelving units and the virtual inventory items. Thereafter, the program virtually shelves the inventory items by allocating shelf space as described above, and checks the inventory item height and width against the shelf height and shelf width constraints. The iterative shelving process described above is repeated until one or more parameters are met (e.g., a set number of iterations have been run) or all the inventory items are shelved (e.g., a threshold shelving efficiency has been reached in at least one iteration, an optimal shelving efficiency has been identified, etc.).

Specifically, the virtual environment generating routine 176 will begin the process of calculating the available shelf space at step 872. Once all the segment lengths are determined (obtained at step 864 or from shelf dimension data available to the virtual environment generating routine 176) at step 874, the virtual environment generating routine 176 will perform initial shelf space calculations at step 876. Thereafter, the virtual environment generating routine 176 can label each of the segments at step 878, and can obtain a maximum shelf length by summing all the segment lengths at step 880.

The exemplary virtual environment generating routine 176 of FIG. 8 subsequently begins the virtual shelving process at step 882. First, the virtual environment generating routine 176 creates a starting shelving unit at step 884 based on the available data (from step 864 or from shelf dimension data available to the virtual environment generating routine 176). The virtual environment generating routine inserts the virtual inventory items generated at step 848 in any of the manners described above (e.g., with a placement direction starting from left to right on a first shelf of the shelving unit). Again, the placement direction can proceed in other directions as desired. Thereafter, the virtual environment generating routine 176 inserts a tier shelf at step 886, and can adjust the tier heights at step 888 depending upon the allowable stack quantity, the number of inventory items, and the like. The shelving process continues with the insertion of additional virtual inventory items as described above. This process of generating a virtual arrangement of inventory items can be repeated as many times as desired (e.g., indicated by a user or otherwise set as a parameter or operating mode at step 889) to generate multiple virtual inventory arrangements (e.g., for different inventory item dimensions and for different placement directions). A2

The virtual environment generating routine 176 can then proceed to check the case height against any height constraints (e.g., a maximum top of box height as described earlier) and to check for a shelf linear space overflow condition at step 890. If the height exceeds the maximum height or an overflow condition exists (determined at step 891), the shelves can be emptied at step 892. The shelf size can thereafter be automatically increased by a predetermined length at step 894 or can be manually increased by a user following a suitable prompt, after which time the shelf spacing can be recalculated at step 896, and the shelving steps 882-891 can be repeated until there is no overflow condition and the height of the shelving assembly being created does not exceed the set maximum height for the shelving assembly. As described earlier, for each inventory arrangement generated by the shelving routine 172 and the virtual environment generating routine 176, an efficiency can be calculated. All the shelving arrangements can then be compared to provide one or more recommended inventory shelving arrangements and/or a proposed inventory shelving solution 899 at step 898.

Figure 9:
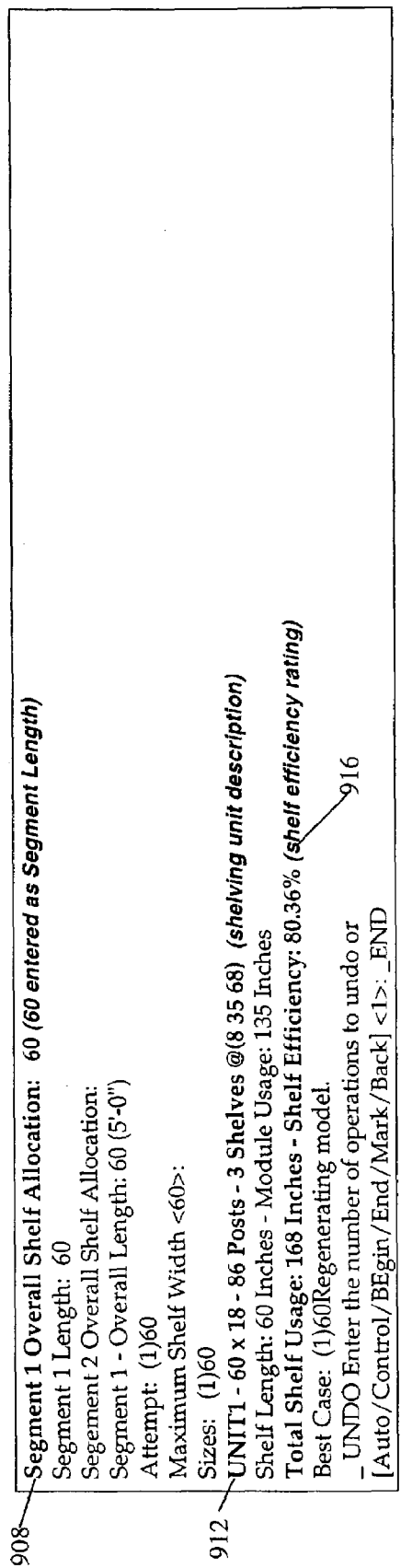
FIG. 9 is an exemplary display of the interactive commands where space allocation is unavailable.
Figure 10:
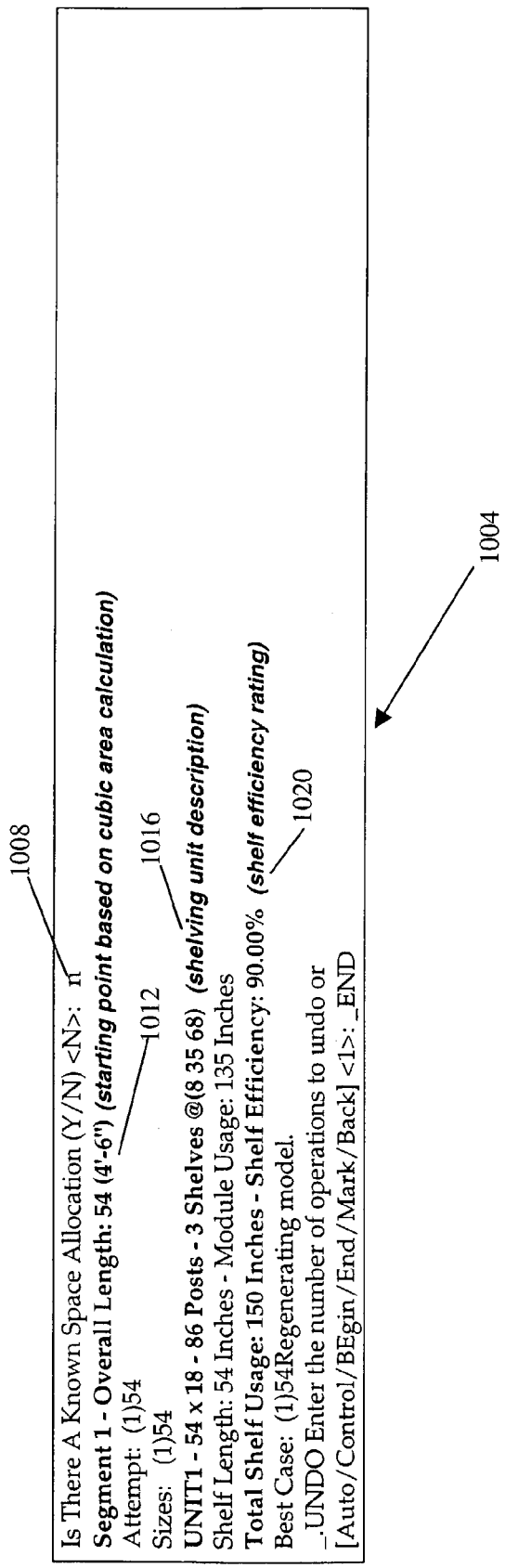
FIG. 10 is a second exemplary display of the interactive commands where space allocation is unavailable.
Figure 10A:
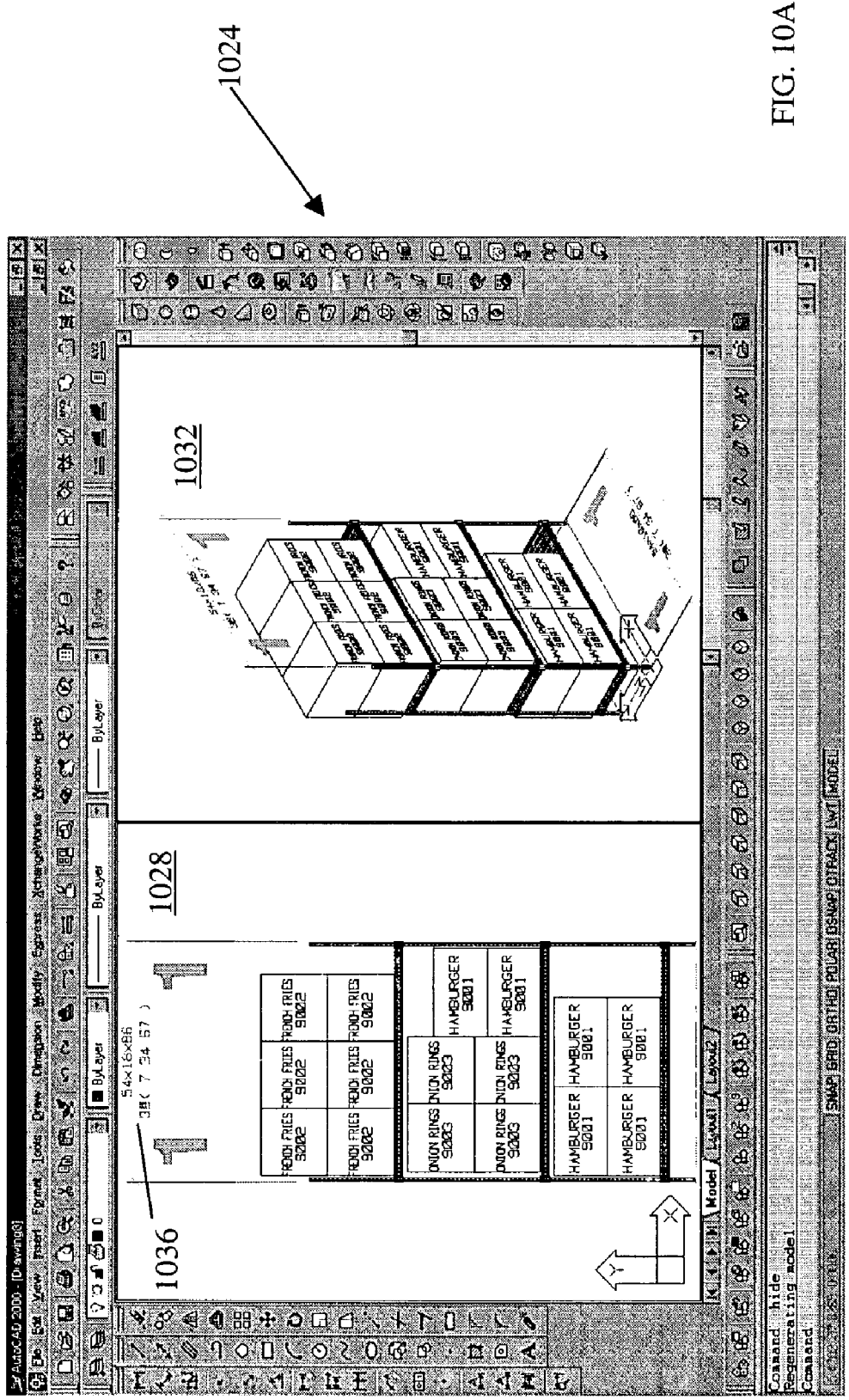
FIG. 10A is a CAD output screen displaying an inventory arrangement using the data entered in FIG. 10 and an unsorted data file.
Figure 10B:
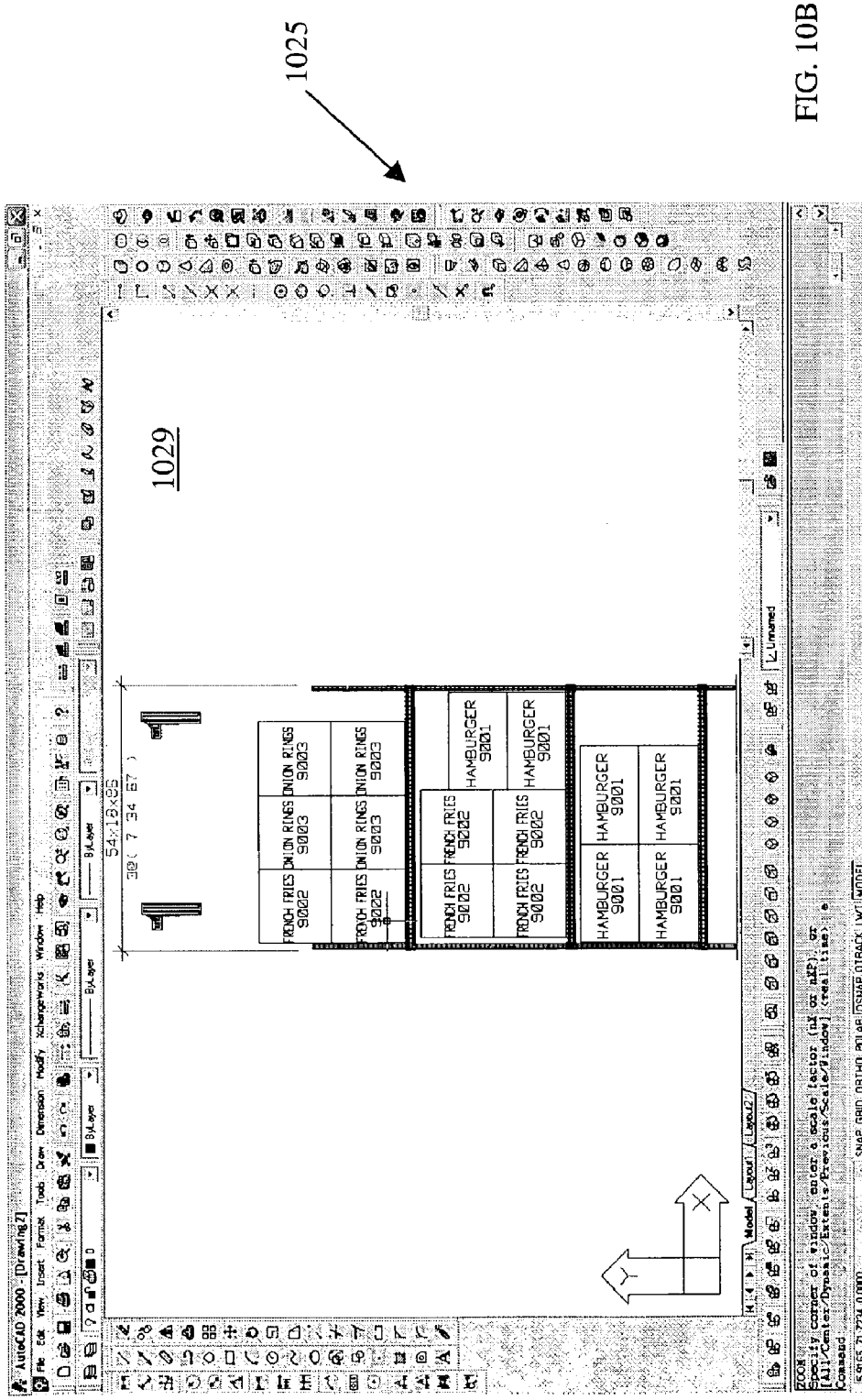
FIG. 10B is a second CAD output screen displaying an inventory arrangement using the data entered in FIG. 10 and a sorted data file.

Examples of results generated by the storage capacity model 100 are presented in FIGS. 9-10B. In one exemplary embodiment, an interactive environment 904 (the same or different from the interactive environment 124 illustrated in FIG. 7) using the parameters entered in FIG. 7 and a known space allocation is shown in FIG. 9. A "60" has been entered at the segment 1 overall shelf allocation prompt 908, meaning that the desired segment length is 60 inches. A shelving assembly 912 generated by the shelving routine 172 and the virtual environment generating routine 176 is also displayed in FIG. 9, and has three 60"×18" shelves on 86" posts. The shelves are located at 8", 35" and 68" from the floor. In some embodiments, the available and/or used shelf space is displayed or otherwise provided to the user. For example, the shelving assembly generated in FIG. 9 also lists a shelf length usage of 135" while the available length is 168", yielding a shelf efficiency 916 of 80.36%. The shelf efficiency 916 in this embodiment is expressed as a percentage of the total linear shelving inches occupied by inventory items (i.e., total occupied length of the shelves in the generated shelving assembly) divided by the total linear shelving length available.

Figure 9A:
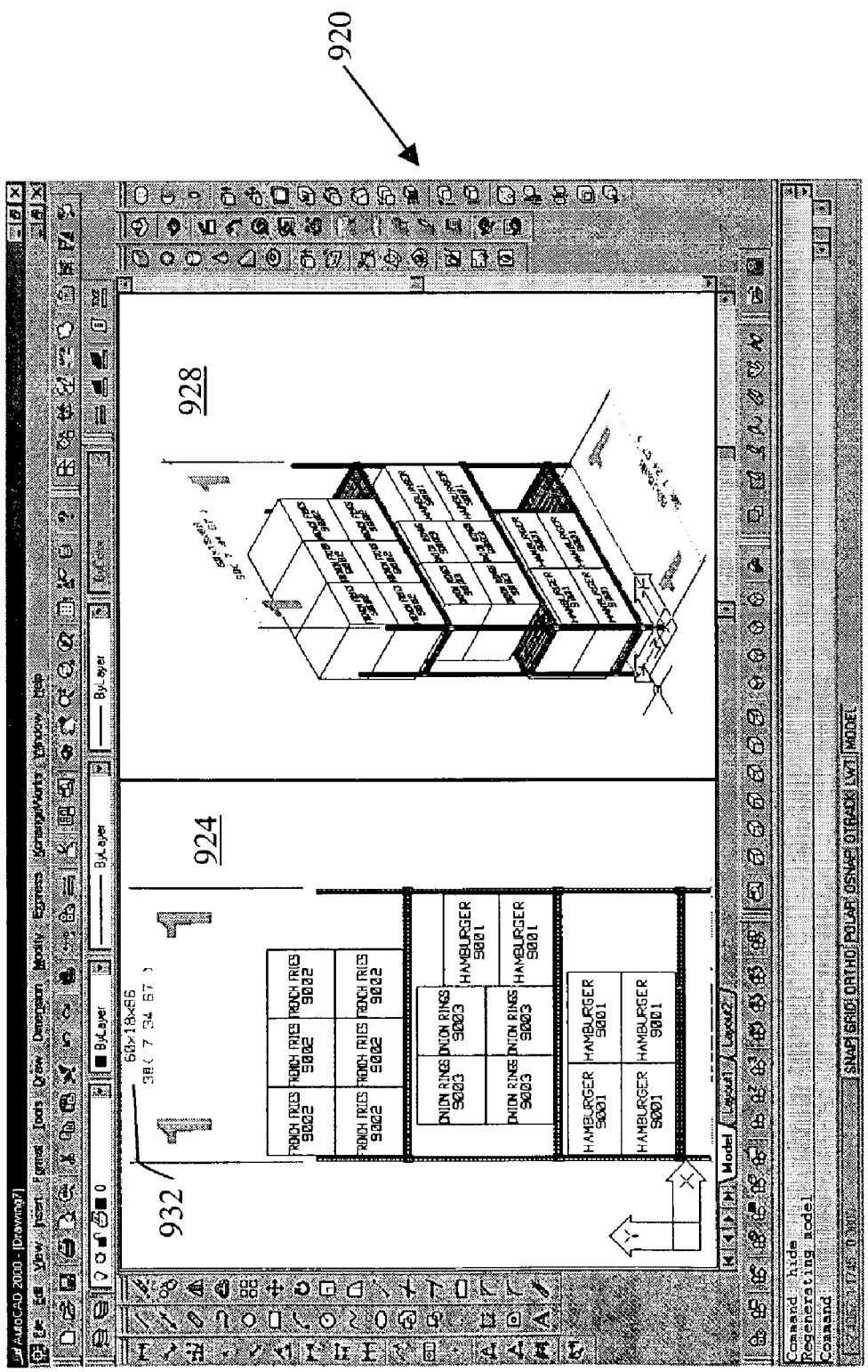
FIG. 9A is a CAD output screen displaying an inventory arrangement using the data entered in FIG. 9 and the unsorted data in FIG. 3A.

In addition to the text information generated by the shelving routine 172 and the virtual environment generating routine 176 in the example illustrated in FIG. 9, a virtual inventory arrangement 920 with the unsorted data illustrated in FIG. 3A is shown in FIG. 9A. The virtual arrangement 920 shows both a elevation view 924 and a perspective view 928 of each individual shelf, although any number and type of views can be displayed as desired. On each of views 924, 928 illustrated, product names and/or inventory numbers can be illustrated, if desired. Shelf assembly information can also be illustrated. For example, the views 924, 928 illustrated in FIG. 9A include a "60×18×86" header 932. The header 932 indicates the dimensions of the shelving unit generated by the shelving routine 172 and the virtual environment generating routine 176. Any amount of inventory and shelving information can be displayed in the views 924, 928 as desired.

Figure 9C:
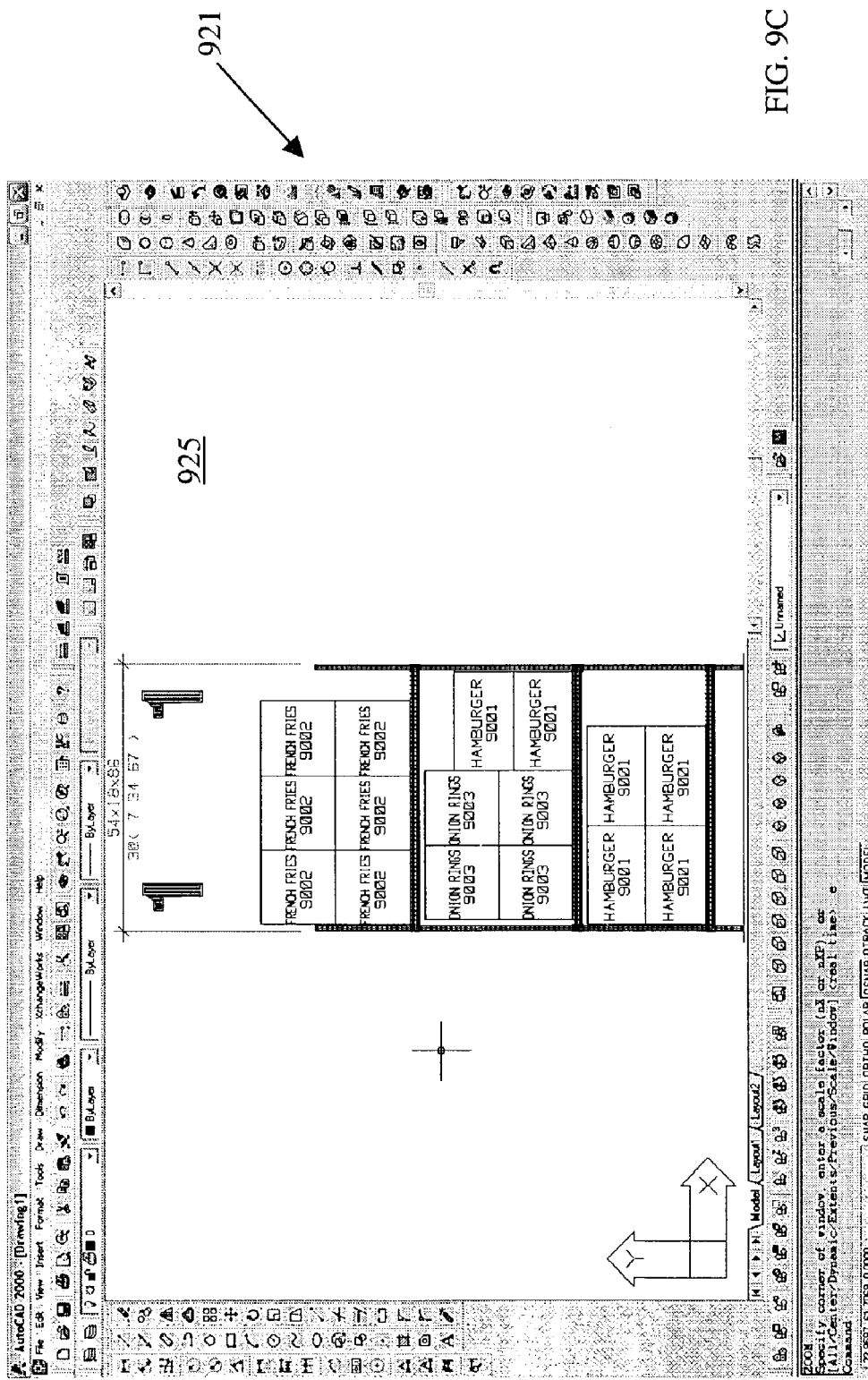
FIG. 9C is a CAD output screen displaying an inventory arrangement using the data entered in FIG. 9B
Figure 9D:
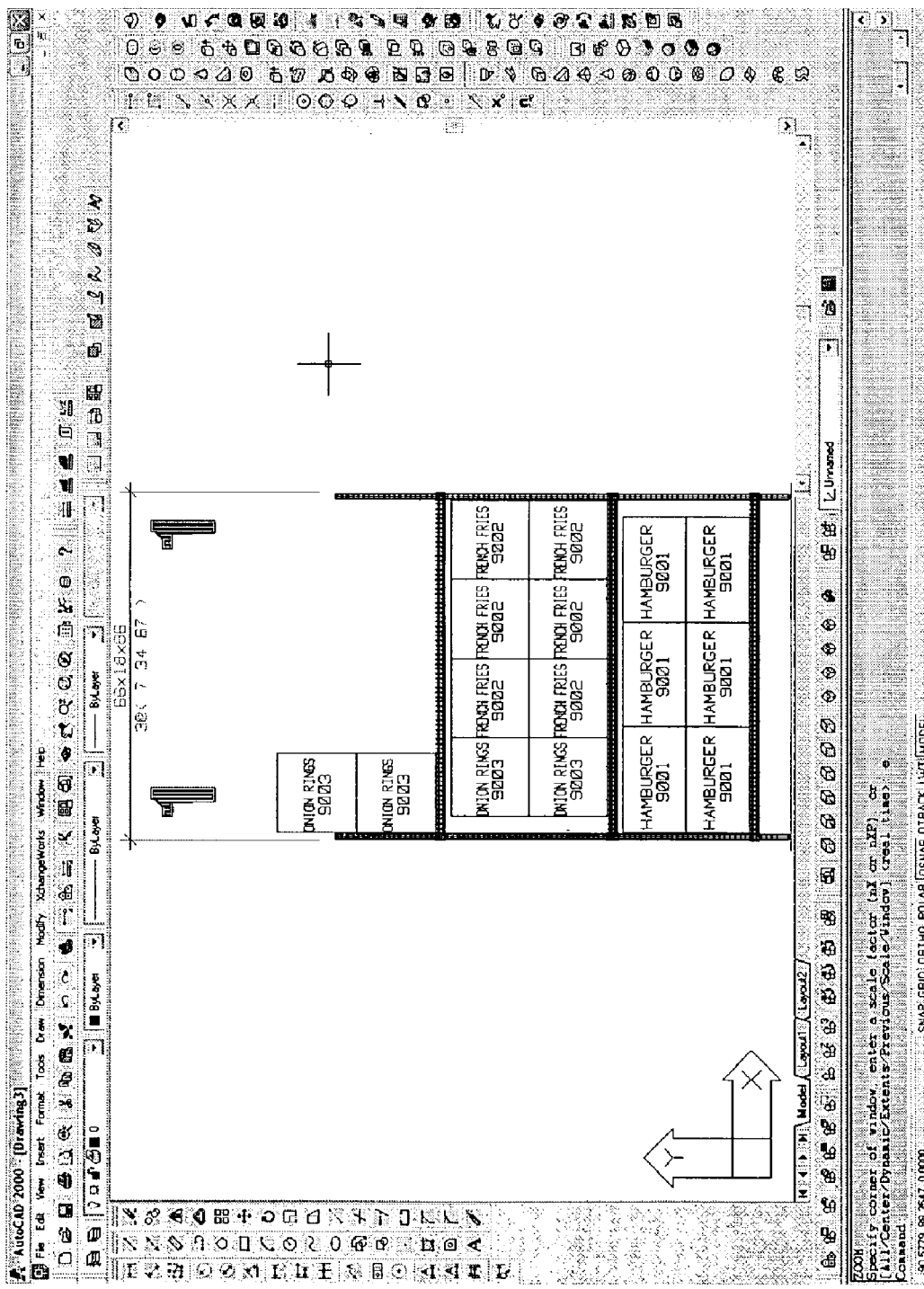
FIG. 9D is a CAD output screen displaying an inventory arrangement using alternative data to that entered in FIG. 9B.

Another example of results provided by the storage capacity model 100 is presented in FIGS. 9B and 9C. As shown in FIG. 9B, a second interactive environment 940 (the same or different from the interactive environment 124 illustrated in FIGS. 7 and 9) displays results from unsorted data in FIG. 3A. In particular, a "48" has been entered at the segment 1 overall shelf allocation prompt 908, meaning that the segment length is 48 (instead of "60" as input in FIG. 9). Using this shelf allocation, an "overflow" error message 944 is generated. The error 944 is followed by a new segment length prompt 948, in which a larger segment length can automatically be input or can be manually entered by a user. In the FIG. 9B example, a "54" is entered, resulting in an inventory arrangement providing a 90.00% shelf utilization. A second resulting virtual inventory item arrangement 921 with the unsorted data (from FIG. 3A) is shown in FIG. 9C. As another example, if a "66" is entered at the prompt 908 of FIG. 9B (meaning that the segment length is 66 inches in length), no "overflow" error message 944 will be displayed when the sorted data in FIG. 4 is used. A third virtual inventory item arrangement 922 generated by the shelving routine 172 and the virtual environment generating routine 176 is illustrated in FIG. 9D, and is generated using the sorted data shown in FIG. 4.

Still other examples of results provided by the storage capacity model 100 are presented in FIGS. 10-10B. As shown in FIG. 10A, a third interactive environment 1004 (the same or different from the interactive environment 124 illustrated in FIGS. 7, 9, and 9B) displays results generated by the shelving routine 172 and the virtual environment generating routine 176 when no known space allocation is indicated (e.g., a "N" answer to "Is There a Known Space Allocation (Y/N)<N>" at prompt 1008). The program displays a "54" as a default length of the shelf unit in prompt 1012, which eventually yields a suggested shelving assembly arrangement 1016 having three 54"×18" shelves on 86" posts. The shelves are located at 8", 35" and 68" from a floor surface. FIG. 10 also lists a shelf length usage of 135" while the available shelf length is 150", yielding a shelf efficiency 1020 of 90.00%. A resulting virtual inventory arrangement 1024 using the unsorted data in FIG. 3A is shown in FIG. 10A. The virtual inventory arrangement 1024 generated by the shelving routine 172 and the virtual environment generating routine 176 in this case shows both a plan view 1028 and an elevation view 1032 of each individual shelf. On each of the views 1024, 1028 illustrated, a product name and an inventory number are also shown. A "54×18×86" header 1036 is also shown in the plan view 1028. The header 1036 indicates the dimensions of the generated shelving unit. That is, the automated version yields a more efficient arrangement for the example given (compared to the generated results illustrated in FIG. 9). A second resulting virtual inventory arrangement 1025 using the sorted data in FIG. 4 is shown in FIG. 10B. The virtual inventory arrangement 1024 shows a plan view 1029 of each individual shelf.

In some embodiments, the drawings produced by the virtual inventory generating routine 176 can be converted into different file formats as needed by other programs and parties. In addition, the drawings can be included in architectural blueprints, and can be converted into rendered images for catalogs or websites.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A computer-based system for arranging a plurality of items in an inventory in a storage space, the computer-based system including an input device, a display, a processor, and a computer-accessible memory, the system comprising:
   an inventory module for generating a master inventory list, the master inventory list including
      dimensions for each one of the plurality of items, and
      a quantity of each one of the plurality of items; and
   a storage shelving module for automatically generating an inventory layout based on the master inventory list, the inventory layout being an arrangement of items of the inventory on at least one shelf, wherein the storage shelving module operates iteratively to generate multiple inventory layouts for the plurality of items.

2. The system of claim 1, wherein each one of the plurality of items is one of a box, a container, a can, a bottle, a carton, a bag, a package, a promotional product, and a seasonal product.

3. The system of claim 1, wherein the master inventory list includes storage space dimensions including a height, a width, and a length of an existing storage space.

4. The system of claim 1, wherein the inventory layout includes a product overflow indicator operable to indicate that an existing storage space is insufficient to store the plurality of items.

5. The system of claim 4, wherein the dimensions of each one of the plurality of items include a height, a width, a length, and a weight.

6. The system of claim 5, wherein the inventory layout includes storage positions for each one of the plurality of items, including a maximum storage height of the plurality of items.

7. The system of claim 5, wherein the inventory layout includes storage positions for each one of the plurality of items, including a maximum stack quantity for at least one of the plurality of items.

8. The system of claim 1, wherein the master inventory list includes a storage orientation for each one of the plurality of items upon the at least one shelf.

9. The system of claim 8, wherein the orientation includes a vertical storage indicator to designate each one of the plurality of items that must be stored vertically.

10. The system of claim 1, wherein the storage shelving module is adapted to compare at least one dimension of each of the plurality of items with at least one dimension of at least one shelf upon which the plurality of items are virtually placed.

11. The system of claim 1, wherein the inventory layout includes at least one graphical representation of shelving for the storage space and storage positions with respect to the shelving for each one of the plurality of items.

12. The system of claim 11, wherein the at least one graphical representation includes at least one three-dimensional representation.

13. The system of claim 11, wherein the at least one graphical representation includes at least one planogram.

14. The system of claim 11, wherein the at least one graphical representation includes indicia for each of the plurality of items.

15. The system of claim 11, wherein the inventory layout includes shelving labels corresponding to each one of the plurality of items.

16. The system of claim 1, wherein the inventory layout includes a shelving design employing standardized shelf and post sizes.

17. The system of claim 1, wherein the inventory layout includes a shelving design having a shelf width sufficiently large to receive a largest one of the plurality of items.

18. The system of claim 1, wherein the inventory layout includes at least one indicator of storage efficiency of the plurality of items.

19. The system of claim 18, wherein the indicator of storage efficiency is a percentage of shelf usage.

20. The system of claim 1, wherein the inventory layout includes dimensions for a new storage space.

21. The system of claim 1, wherein the inventory module includes a spreadsheet template in which information regarding the plurality of items is stored.

22. The system of claim 1, wherein the master inventory list includes one of a plurality of sorting codes corresponding to each one of the plurality of items.

23. The system of claim 22, wherein the storage space is used to store a plurality of items for a kitchen, and wherein the plurality of sorting codes correspond to different storage locations in the restaurant.

24. The system of claim 22, wherein the plurality of sorting codes includes a high volume code identifying those items of the plurality of items that are frequently used.

25. The system of claim 1, wherein the master inventory list includes a minimum bottom shelf height value.

26. The system of claim 1, wherein the master inventory list includes a maximum storage height value for a ceiling clearance of the storage space.

27. A method of arranging a plurality of items of an inventory in a storage space, the method comprising:
inputting data representative of at least one dimension and a quantity of each of the plurality of items;
generating a master inventory including
dimensions for each one of the plurality of items, and
a quantity for each one of the plurality of items;
automatically generating via a processor an inventory layout of the plurality of items based at least in part upon the master inventory list, the inventory layout being an arrangement of the plurality of items in the inventory on at least one shelf, wherein the processor operates iteratively to generate multiple inventory layouts for the plurality of items; and
displaying the inventory layout upon a display screen.

28. The method of claim 27, wherein generating a master inventory list includes generating a master inventory list for the plurality of items including at least one of a box, a container, a can, a bottle, a carton, a bag, a package, a promotional product, and a seasonal product.

29. The method of claim 27, wherein generating a master inventory list includes specifying storage space dimensions of an existing storage space, the storage space dimensions including at least one of a height, a width, and a length.

30. The method of claim 27, wherein generating a master inventory list including dimensions for each one of the plurality of items includes specifying at least one of a height, a width, a length, and a weight for each one of the plurality of items.

31. The method of claim 29, further comprising indicating whether the existing storage space is insufficient to store the plurality of items.

32. The method of claim 30, further comprising assigning a maximum storage height to each one of the plurality of items.

33. The method of claim 30, further comprising assigning a maximum stack quantity to each one of the plurality of items.

34. The method of claim 27, wherein generating a master inventory list includes specifying a storage orientation for at least one of the plurality of items.

35. The method of claim 27, wherein generating a master inventory list includes specifying whether each one of the plurality of items must be stored vertically.

36. The method of claim 27, wherein generating an inventory layout includes generating a graphical representation of shelving for the storage space and storage positions for each of the plurality of items with respect to the shelving.

37. The method of claim 36, wherein generating a graphical representation includes generating a three-dimensional representation.

38. The method of claim 36, wherein generating a graphical representation includes generating at least one planogram.

39. The method of claim 36, wherein generating a graphical representation includes generating a graphical representation of each of the plurality of items on the shelving.

40. The method of claim 36, wherein generating a graphical representation includes generating shelving labels corresponding to each one of the plurality of items.

41. The method of claim 27, wherein generating an inventory layout includes generating a shelving design employing shelves and post having standardized sizes.

42. The method of claim 27, wherein generating an inventory layout includes generating a shelving design having a shelf width sufficiently large for a largest one of the plurality of items.

43. The method of claim 27, wherein generating an inventory layout includes generating data representative of storage efficiency of the plurality of items on the at least one shelf.

44. The method of claim 27, wherein generating an inventory layout includes generating dimensions of a shelving assembly.

45. The method of claim 27, further comprising assigning to each one of the plurality of items in the master inventory list at least one of a plurality of sorting codes.

46. The method of claim 45, wherein generating a master inventory list includes generating a master inventory list for a kitchen, and wherein assigning to each one of the plurality of items in the master inventory list at least one of a plurality of sorting codes includes assigning a cooler code, a freezer code, a dry storage code, a front counter code, a drive through code, a workstation code, and a janitorial code.

47. The method of claim 45, wherein assigning to each one of the plurality of items in the master inventory list at least one of a plurality of sorting codes includes indicating whether items of the plurality of items are frequently used.

48. The method of claim 27, wherein generating a master inventory list includes specifying a minimum bottom shelf height value.

49. The method of claim 27, wherein generating a master inventory list includes specifying a maximum storage height value for a ceiling clearance of the storage space.

50. An automated method of preparing an arrangement of items in an inventory on at least one shelf, the method comprising:
 receiving dimensions of items in the inventory input into a user interface by a user;
 comparing at least one dimension of an item in the inventory with at least one dimension of a first shelf in a memory;
 automatically allocating a space upon the first shelf to the item in the inventory if the at least one dimension of the item is no greater than the at least one dimension of the first shelf stored in the memory;
 comparing the at least one dimension of the item in the inventory with at least one dimension of a second shelf stored in the memory if the at least one dimension of the item is greater than the at least one dimension of the shelf stored in the memory; and
 repeating both comparing steps and the allocating step with at least one other item in the inventory to generate multiple inventory layouts for the plurality of items.

51. The method as claimed in claim 50, further comprising displaying the first and second shelves and the items in the inventory.

52. The method as claimed in claim 50, further comprising calculating at least one of a linear shelf utilization, an area shelf utilization, and a volume shelf utilization based at least partially upon the at least one dimension of the first and second items in the inventory to which space has been allocated on the first and second shelves and the at least one dimension of the first and second shelves.

53. The method as claimed in claim 52, wherein receiving dimensions of items includes receiving dimensions of items from a user via a user input device.

54. The method as claimed in claim 53, wherein the user input device is at least one of a keyboard and a mouse.

55. An automated method of storing items of an inventory on shelving, the method comprising:
 obtaining inventory data at a processor, the inventory data including at least one inventory characteristic;
 obtaining shelving data at the processor, the shelving data having at least one shelf characteristic;
 generating via the processor a plurality of virtual inventory items using the inventory data;
 generating via the processor a plurality of virtual shelves using the shelving data;
 repeatedly and automatically shelving the virtual inventory on the virtual shelves in an arrangement based at least in part upon at least one of the inventory characteristics;
 determining a shelf usage based at least in part upon the shelved virtual inventory; and
 repeating shelving the virtual inventory to generate additional arrangements of inventory.

56. The method of claim 55, further comprising terminating shelving the virtual inventory when all of the inventory has been virtually shelved.

57. The method of claim 55, wherein repeating shelving the virtual inventory to generate additional arrangements of inventory is based at least in part upon at least one of the inventory characteristics, each additional arrangement having a respective shelf usage; and
 wherein the method further comprises selecting an inventory arrangement from the arrangement and the additional arrangements based at least partially upon a comparison of the shelf usages thereof.

58. The method of claim 55, further comprising determining a shelf height based at least partially upon the shelving data and the inventory data.

59. The method of claim 55, further comprising obtaining a shelf segment length at the processor, the shelf segment length representative of an available space for the virtual shelves.

60. The method of claim 55, further comprising sorting the inventory data using at least one inventory characteristic.

61. The method of claim 55, wherein obtaining inventory data at a processor further comprises obtaining a location where the inventory data is stored.

62. The method of claim 55, further comprising generating an overflow indicator when the virtual inventory does not fit upon the virtual shelves.

63. The method of claim 55, further comprising generating an inventory layout based at least partially upon the determined shelf usage.

64. The method of claim 63, wherein the inventory layout comprises a plurality of storage positions for the virtual inventory.

65. The method of claim 55, wherein the inventory data comprises storage orientations for items in the inventory.

66. The method of claim 55, wherein the inventory data comprises weights of items in the inventory.

67. The method of claim 55, wherein the inventory data comprises dimensions of items in the inventory.

68. The method of claim 55, wherein the inventory data comprises stacking quantities of items in the inventory.

69. The method of claim 55, wherein the inventory data comprises sorting codes of items in the inventory.

70. An automated storage method for generating shelving arrangements of items in an inventory, the method comprising:
 obtaining data at a processor, the data including a plurality of inventory characteristics;
 repeatedly virtually shelving inventory in an automated manner starting with at least one of the inventory characteristics;
 determining a shelf usage based on the inventory characteristics; and
 repeating virtually shelving inventory and determining shelf usage to generate a plurality of different inventory arrangements upon shelving.

71. The method of claim 70, further comprising terminating virtual shelving when the inventory has been virtually shelved.

72. The method of claim 71, further comprising:
 collecting a plurality of shelf usages corresponding to the plurality of different inventory arrangements; and
 selecting a shelf usage from the plurality of shelf usages.

73. The method of claim 70, wherein obtaining data at the processor further comprises obtaining shelving data, the shelving data having a plurality of shelf characteristics.

74. The method of claim 70, further comprising determining a shelf height based at least partially upon the data.

75. The method of claim 70, further comprising obtaining a shelf segment length at the processor, the shelf segment length representative of available space for a virtual shelving unit in which the inventory is shelved.

76. The method of claim 70, further comprising sorting the inventory data using at least one inventory characteristic.

77. The method of claim 70, wherein obtaining data at a processor further comprises obtaining a location where the data is stored.

78. The method of claim 70, further comprising generating an overflow indicator when the shelf usage exceeds 100%.

79. The method of claim 70, further comprising generating an inventory layout based at least partially upon the determined shelf usage.

80. The method of claim 79, wherein the inventory layout comprises a plurality of storage positions for the virtual inventory.

81. The method of claim 80, wherein the inventory characteristics include a storage orientation.

82. The method of claim 70, wherein the inventory characteristics include a weight.

83. The method of claim 70, wherein the inventory characteristics include a plurality of inventory dimensions.

84. The method of claim 70, wherein the inventory characteristics include a stacking quantity.

85. The method of claim 70, wherein the inventory characteristics include an inventory sorting code.

86. The method of claim 70, further comprising allocating virtual space on a virtual shelving unit to the inventory.

\* \* \* \* \*